(12) United States Patent
Yoshioka

(10) Patent No.: US 8,358,241 B2
(45) Date of Patent: Jan. 22, 2013

(54) POSITION CALCULATING METHOD AND POSITION CALCULATING DEVICE

(75) Inventor: Hiroki Yoshioka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 325 days.

(21) Appl. No.: 12/762,951

(22) Filed: Apr. 19, 2010

(65) Prior Publication Data

US 2010/0265134 A1   Oct. 21, 2010

(30) Foreign Application Priority Data

Apr. 20, 2009   (JP) ................................. 2009-101571

(51) Int. Cl.
*G01S 19/40* (2010.01)
*G01S 19/30* (2010.01)

(52) U.S. Cl. .............................. 342/357.23; 342/357.69

(58) Field of Classification Search ............. 342/357.23, 342/357.25, 357.62, 357.69; 701/468, 495
See application file for complete search history.

(56) References Cited

U.S. PATENT DOCUMENTS

| | | | |
|---|---|---|---|
| 2006/0125691 A1* | 6/2006 | Menache et al. | 342/450 |
| 2008/0129598 A1* | 6/2008 | Godefroy et al. | 342/450 |
| 2009/0096671 A1* | 4/2009 | Mizuochi | 342/357.12 |

FOREIGN PATENT DOCUMENTS

JP   2001-337156 A   12/2001

\* cited by examiner

*Primary Examiner* — Dao Phan
(74) *Attorney, Agent, or Firm* — Kilpatrick Townsend & Stockton LLP

(57) ABSTRACT

A position calculating method includes: estimating a reception frequency and a code phase related to reception of a positioning signal from a positioning satellite as an estimated measurement; acquiring a reception frequency and a code phase on the basis of the positioning signal received from the positioning satellite; setting a value of an error parameter as an observed measurement, which is used in position calculation using a Kalman filter, on the basis of a difference between the observed measurement and the estimated measurement; and calculating a position by performing the position calculation using the error parameter value.

8 Claims, 30 Drawing Sheets

|  | AVERAGE POSITION ERROR [m] | AVERAGE MOVING SPEED ERROR [m/s] |
|---|---|---|
| FIRST EXPERIMENT | 7.103 | 0.3620 |
| SECOND EXPERIMENT | 0.9699 | 0.1897 |

| RELIABILITY DEGREE | EXPECTED ERROR | | |
|---|---|---|---|
| | TYPE 1 EXPECTED ERROR | TYPE 2 EXPECTED ERROR | TYPE 3 EXPECTED ERROR |
| 1 | ESTIMATION DIFFERENCE < FIRST THRESHOLD | OBSERVATION DIFFERENCE ≥ SECOND THRESHOLD | XPR ≥ THIRD THRESHOLD |
| 2 | ESTIMATION DIFFERENCE ≥ FIRST THRESHOLD | OBSERVATION DIFFERENCE < SECOND THRESHOLD | XPR < THIRD THRESHOLD |
| 3 | PRIOR TO FIRST FIX | NO PREVIOUS OBSERVED MEASUREMENT | — |

| SIGNAL STRENGTH | EXPECTED ERROR MODEL EQUATION ||
|---|---|---|
| | MODEL EQUATION FOR CODE PHASE | MODEL EQUATION FOR RECEPTION FREQUENCY |
| -130dBm | $E_{CP} = a_1 x + b_1$ | $E_F = c_1 x + d_1$ |
| -131dBm | $E_{CP} = a_2 x + b_2$ | $E_F = c_2 x + d_2$ |
| -132dBm | $E_{CP} = a_3 x + b_3$ | $E_F = c_3 x + d_3$ |
| ⋮ | ⋮ | ⋮ |

| CAPTURED SATELLITE | OBSERVED MEASUREMENT || ESTIMATED MEASUREMENT ||
|---|---|---|---|---|
| | CODE PHASE | RECEPTION FREQUENCY | CODE PHASE | RECEPTION FREQUENCY |
| S1 | CP11 | F11 | CP21 | F21 |
| S2 | CP12 | F12 | CP22 | F22 |
| S3 | CP13 | F13 | CP23 | F23 |
| ⋮ | ⋮ | ⋮ | ⋮ | ⋮ |

| SIGNAL STRENGTH | EXPECTED ERROR MODEL EQUATION | | | | | |
|---|---|---|---|---|---|---|
| | TYPE 1 MEASUREMENT PARAMETER | | TYPE 2 MEASUREMENT PARAMETER | | TYPE 3 MEASUREMENT PARAMETER | |
| | MODEL EQUATION FOR CODE PHASE | MODEL EQUATION FOR RECEPTION FREQUENCY | MODEL EQUATION FOR CODE PHASE | MODEL EQUATION FOR RECEPTION FREQUENCY | MODEL EQUATION FOR CODE PHASE | MODEL EQUATION FOR RECEPTION FREQUENCY |
| -130dBm | $E_{CP} = a_1 x + b_1$ | $E_F = c_1 x + d_1$ | $E_{CP} = e_1 x + f_1$ | $E_F = g_1 x + h_1$ | $E_{CP} = j_1 x + k_1$ $(x < x_1)$ $E_{CP} = m_1 x + n_1$ $(x \geq x_1)$ | $E_F = p_1 x + q_1$ $(x < x_4)$ $E_F = s_1 x + t_1$ $(x \geq x_4)$ |
| -131dBm | $E_{CP} = a_2 x + b_2$ | $E_F = c_2 x + d_2$ | $E_{CP} = e_2 x + f_2$ | $E_F = g_2 x + h_2$ | $E_{CP} = j_2 x + k_2$ $(x < x_2)$ $E_{CP} = m_2 x + n_2$ $(x \geq x_2)$ | $E_F = p_2 x + q_2$ $(x < x_5)$ $E_F = s_2 x + t_2$ $(x \geq x_5)$ |
| -132dBm | $E_{CP} = a_3 x + b_3$ | $E_F = c_3 x + d_3$ | $E_{CP} = e_3 x + f_3$ | $E_F = g_3 x + h_3$ | $E_{CP} = j_3 x + k_3$ $(x < x_3)$ $E_{CP} = m_3 x + n_3$ $(x \geq x_3)$ | $E_F = p_3 x + q_3$ $(x < x_6)$ $E_F = s_3 x + t_3$ $(x \geq x_6)$ |
| ... | ... | ... | ... | ... | ... | ... |

POSITION CALCULATING METHOD AND POSITION CALCULATING DEVICE

This application claims priority to Japanese Patent Application No. 2009-101571, filed Apr. 20, 2009, the entirety of which is hereby incorporated by reference.

BACKGROUND

1. Technical Field

The present invention relates to a position calculating method and a position calculating device.

2. Related Art

A GPS (global positioning system) is widely known as a positioning system using a positioning signal and is used for a position calculating device built in a mobile phone, a car navigation apparatus, or the like. The GPS performs a position calculation operation for calculating its own position on the basis of the information, such as the positions of a plurality of GPS satellites or a pseudo range from each GPS satellite to the GPS.

As a known example of the position calculation operation, calculation using a least square method is widely used. A technique of calculating the position by performing a position calculation operation using a Kalman filter was also proposed as another method (for example, JP-A-2001-337156).

The technique using the Kalman filter is an estimation method based on the probability theory of estimating the state function changing with time by using an observed value including an error. The Kalman Filter method includes an estimation process to estimate a state function of a target system and a correction process to correct the estimated state function. The state function is generally corrected and updated with given externally-observed values, but in this method the expected observed-value is given as an observation error. An observation error is generally known as a value R.

The position calculation using the Kalman filter generally uses a position or a moving speed of a position calculating device as a state function and externally-observed values such as a phase or a frequency of GPS satellite signals received by the position calculating device as observed values to apply to the positioning calculation logic of the Kalman Filter. However, since the magnitude of error in the observed values is unknown, the calculation is often performed using a predetermined fixed value in place of the observation error.

If the position is calculated using a larger observation error than the actual error in the observed values, the filter may effect so strongly that a "position delay", in which the calculated position is temporally delayed with respect to the actual position, or a "shortcut", in which the followability of the calculated position lowers at curves or turns, may occur. As a result, accuracy in the position calculation lowers.

SUMMARY

An advantage of some aspects of the invention is to propose a method to determine an observation error to improve accuracy in position calculations.

According to a first aspect of the invention, there is provided a position calculating method including, estimating a reception frequency and a code phase related to reception of a positioning signal from a positioning satellite as an estimated measurement, acquiring a reception frequency and a code phase based on the positioning signal received from the positioning satellite as an observed measurement, determining an error parameter value to be used in a position calculation using a Kalman filter based on a difference between the observed measurement and the estimated measurement, and calculating a position using the error parameter value.

According to another aspect of the invention, there is provided a position calculating device including, an estimating section that estimates reception frequency and a code phase related to reception of a positioning signal from a positioning satellite as an estimated measurement, an observation section that acquires a reception frequency and a code phase based on the positioning signal received from the positioning satellite as an observed measurement, a determining section that determines an error parameter value to be used in a position calculation using a Kalman filter based on a difference between the observed measurement and the estimated measurement, and a position calculating section that calculates a position by executing the position calculation using the error parameter value.

According to the first aspect and the like of the invention, the estimated measurement including at least the reception frequency and the code phase upon receiving a positioning signal is estimated. The observed measurement including at least the reception frequency and the code phase is acquired based on the positioning signal received from the positioning satellite. Then the error parameter value to be used in the position calculation using the Kalman filter is determined based on the difference between the observed measurement and the estimated measurement. Then the position is calculated by performing the position calculation using the error parameter value.

A measurement relating to receiving a positioning signal includes at least a reception frequency and a code phase of the positioning signal. An error parameter includes a parameter that indicates an expected magnitude of error of the measurement. Although the details will be described later, the inventor of the present application has found that determining an error parameter value by using a parameter value that strongly correlates with actual error contained in the measurement reduces positioning error in the result of the position calculation. The parameter indicating a difference between the observed measurement and the estimated measurement shows a linear relationship with the actual error contained, and hence there is a strong correlation between them. Therefore, setting an error parameter value based on the difference between the observed measurement and the estimated measurement enables to determine an observation error that approximates an actual error in the observed value. As a result, the accuracy of position calculation is improved.

According to a second aspect of the invention, the position calculating method according to the first aspect of the invention may further include, estimating a state vector used in the position calculation, and correcting the estimated state vector. The estimating of the estimated measurement may include estimating process estimating a first estimated measurement based on the predicted state vector, and the calculating of the position may include calculating a position based on the corrected state vector.

According to the second aspect of the invention, prediction of the state vector used in the position calculation and correction of the predicted state vector are performed. The first estimated measurement is predicted based on the predicted state vector, and the position is calculated based on the corrected state vector.

According to a third aspect of the invention, in the position calculating method according to the second aspect of the invention, the estimating of the estimated measurement may include estimating a second estimated measurement at the time of calculating the position based on a measurement taken previously and the elapsed time since.

According to the third aspect of the invention, the second estimated measurement at a time of a position calculation is estimated based on the observed measurement taken previously at the time of receiving the satellite signal and the elapsed time since. The second estimated measurement is based on the actually-observed measurements, and hence usable to appropriately estimate the measurements at a time of the position calculation. Accordingly, the observation error can be appropriately determined.

According to a fourth aspect of the invention, the position calculating method according to the third aspect of the invention may further include determining reliability degree of the first estimated measurement and reliability degree of the second estimated measurement. Determining the error parameter value may include setting the error parameter value using at least one of the first estimated measurement and the second estimated measurement according to the determination result of the reliability degree.

According to the fourth aspect of the invention, reliability degree of the first estimated measurement and reliability degree of the second estimated measurement are determined, and the error parameter value is set using at least one of the first estimated measurement and the second estimated measurement according to the determination result of the reliability degree. This allows to use, for example, the second estimated measurement to determine the error parameter value when the reliability degree of the first estimated measurement is low, or to use both of the first and second estimated measurements to determine the error parameter value when the reliability degrees of the first estimated measurement and the second estimated measurements are both high.

According to a fifth aspect of the invention, the position calculating method according to the fourth aspect of the invention may further include adjusting the determined error parameter value based on previous error parameter values if the reliability degree satisfies a predetermined reliability condition, and calculating the position may include calculating a position using the adjusted error parameter value.

According to the fifth aspect of the invention, when it is determined that the reliability degree of the estimated measurement satisfies a predetermined low reliability degree condition, the determined error parameter value is adjusted based on the previous error parameter values. Then, the position is calculated using the adjusted error parameter value. This allows the determined error parameter value to be adjusted, for example, based on a previous error parameter value from a previous measurement with higher reliability degree, when the reliability degree of the first estimated measurement is low. As such, the position calculation using the more realistic error parameter value. As a result, the accuracy of the position calculation is further improved.

According to a sixth aspect of the position calculating method according to any one of the first to fifth aspects in which a corresponding relationship among the signal strength, a difference between the observed measurement and the estimated measurement and an expected error in the observed measurement are predetermined, the invention may further include, measuring signal strength of the received positioning signal, in which the determining the error parameter value may include obtaining an expected error using the measured signal strength and the difference between the observed measurement and the estimated measurement to determine the error parameter value based on the expected error.

According to the sixth aspect of the invention, the signal strength of the received positioning signal is measured, and the expected error is calculated according to the corresponding relationship set beforehand using the measured signal strength and the difference between the observed measurement and the estimated measurement. Then, the error parameter value is set based on the calculated expected error.

By setting the corresponding relationship of the expected error of the measurement and the difference between the observed measurement and the estimated measurement beforehand and calculating the expected error according to the corresponding relationship, the error parameter value is able to be determined without complication. The corresponding relationship may be predetermined according to the signal strength of a positioning signal to determine a more realistic error parameter value accordingly to the signal strength of the received positioning signal.

According to a seventh aspect of the position calculating method according to the first aspect of the invention, in which a corresponding relationship among signal strength of the positioning signal, signal quality evaluation index of the positioning signal and an expected error in the observed measurement are predetermined, the position calculation may further include, measuring a signal strength of the received positioning signal, calculating a signal quality evaluation index value of the received positioning signal, in which determining the error parameter value may include obtaining the expected error using the measured signal strength and the calculated signal quality evaluation index to determine the error parameter value based on the expected error According to the seventh aspect of the invention, the signal strength of the received positioning signal is measured, and the signal quality evaluation index value of the received positioning signal is calculated. The expected error is calculated according to the corresponding relationship set beforehand using the measured signal strength and the calculated signal quality evaluation index value, and the error parameter value is set on the basis of the expected error.

The signal quality evaluation index value is a parameter for evaluating the signal quality of the positioning signal. For example, the reliability degree index XPR is equivalent to the signal quality evaluation index value. By setting the corresponding relationship of the signal strength of the positioning signal, the signal quality evaluation index value, and the expected error of the measurement beforehand and calculating the expected error according to the corresponding relationship, it becomes possible to set the error parameter value easily and appropriately.

BRIEF DESCRIPTION OF THE DRAWINGS

The invention will be described with reference to the accompanying drawings, wherein like numbers reference like elements.

FIG. 19 is a view showing an example of the data configuration of the data for reliability degree determination.

FIG. 22 is a view showing an example of the data configuration of the expected error model equation data.

FIG. 23 is a view showing an example of the data configuration of measurement data.

FIG. 29 is a view showing an example of the data configuration of the second expected error model equation data.

DESCRIPTION OF EXEMPLARY EMBODIMENTS

Hereinafter, an embodiment when the invention is applied to a mobile phone as a kind of electronic apparatus provided with a position calculating device, will be described with reference to the accompanying drawings. Embodiments to which the invention can be applied are not limited to the embodiment to be described below.

1. Functional Configuration

Figure 1:
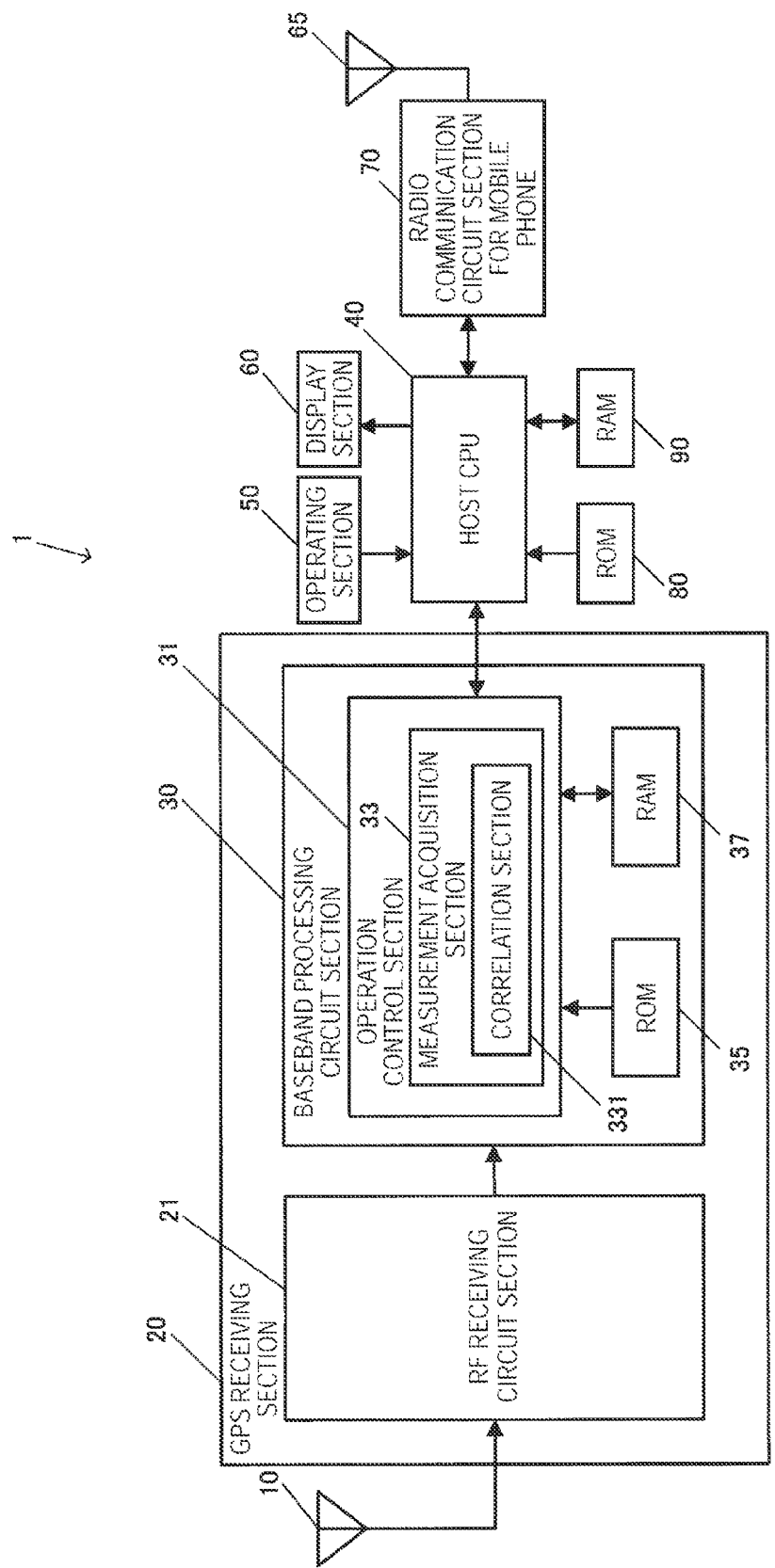
FIG. 1 is a block diagram showing the functional configuration of a mobile phone.

FIG. 1 is a block diagram showing the functional constitution of a mobile phone 1 in the present embodiment. The mobile phone 1 is configured to include a GPS antenna 10, a GPS receiving section 20, a host Central Processing Unit ("CPU") 40, an operating section 50, a display section 60, a mobile phone antenna 65, a radio communication circuit section 70 for a mobile phone, a read-only memory ("ROM") 80, and a random-access memory ("RAM") 90.

The GPS antenna 10 is an antenna that receives a radio frequency ("RF") signal including a GPS satellite signal transmitted from the GPS satellite, and outputs the received signal to the GPS receiving section 20. The GPS satellite signal is a communication signal with a frequency of 1.57542 [GHz] that is modulated by the direct spread spectrum method using a PRN (Pseudo Random Noise) code which is a kind of different spread code for every satellite. The PRN code is a pseudo random noise code which has a code length of 1023 chips as 1 PN frame and has a repetition period of 1 ms.

The GPS receiving section 20 is a position calculation circuit which measures the position of the mobile phone 1 on the basis of a signal output from the GPS antenna 10, and is also a functional block equivalent to a so-called GPS receiver. The GPS receiving section 20 is configured to include an RF (Radio Frequency) receiving circuit section 21 and a baseband processing circuit section 30. The RF receiving circuit section 21 and the baseband processing circuit section 30 may be manufactured as separate Large Scale Integration ("LSIs") or may be manufactured as one chip.

The RF receiving circuit section 21 is a circuit block for RF signal processing and generates an oscillation signal for RF signal multiplication by dividing or multiplying a predetermined oscillation signal. Then, the RF signal is down-converted into a signal with an intermediate frequency (hereinafter, referred to as an "IF (intermediate frequency) signal") by multiplying the RF signal output from the GPS antenna 10 by the generated oscillation signal, and the IF signal is amplified, for example. Then, the IF signal is converted into a digital signal by an A/D converter and is then output to the baseband processing circuit section 30.

The baseband processing circuit section 30 is a circuit section that captures and extracts a GPS satellite signal by performing correlation processing or the like on the IF signal output from the RF receiving circuit section 21 and that acquires a navigation message, time information, and the like by decoding the data. The baseband processing circuit section 30 is configured to include an operation control section 31, a ROM 35, and a RAM 37. The operation control section 31 is configured to include a measurement acquisition operation section 33.

The measurement acquisition operation section 33 is a circuit section that captures a GPS satellite signal from the received signal (IF signal), which is output from the RF receiving circuit section 21, and is configured to include a correlation operation section 331. The measurement acquisition operation section 33 acquires the information, such as the reception frequency or code phase of the GPS satellite signal, and outputs the information to the host CPU 40 as the observed measurement. The measurement acquisition operation section 33 measures the signal strength of the captured GPS satellite signal and outputs the measured signal strength to the host CPU 40.

The correlation operation section 331 captures a GPS satellite signal from the received signal by performing correlation operation processing for calculating and integrating the correlation between a PRN code included in the received signal and a replica code generated in the apparatus, for example, using the FFT (Fast Fourier Transform) operation. The replica code is a simulated signal of a PRN code which is generated in a pseudo manner and is included in a GPS satellite signal to be captured.

If a GPS satellite signal to be captured is correct, the replica code and the PRN code included in the GPS satellite signal will coincide with each other (capture success). If it is wrong, the replica code and the PRN code included in the GPS satellite signal will not coincide (capture failure). Accordingly, it can be determined whether or not capturing of a GPS satellite signal has succeeded by determining the peak of the calculated correlation value. Thus, the GPS satellite signal can be captured by performing a correlation operation with the same received signal while sequentially changing the replica code.

The correlation operation section 331 performs the above-described correlation processing while changing the frequency and the phase of the replica code generated signal. When the frequency of the replica code generated signal and the frequency of the received signal coincide with each other and the phase of the PRN code and the phase of the replica code coincide with each other, the correlation value is maximum.

More specifically, the range of predetermined frequency and phase corresponding to the GPS satellite signal to be captured is set as a search range. Then, a correlation operation in the phase direction for detecting the starting position (code phase) of a PRN code and a correlation operation in the frequency direction for detecting the frequency are performed within the search range. The search range related to the frequency is set within a predetermined frequency sweep range having 1.57542 [GHz], which is a carrier frequency of the GPS satellite signal, as a center frequency, and the search range related to the phase is set within a code phase range of 1023 chips which are the chip length of the PRN code.

The host CPU 40 is a processor which performs overall control of the sections of the mobile phone 1 according to various programs, such as a system program, stored in the ROM 80. The host CPU 40 calculates the position of the mobile phone 1 by performing the position calculation to determine the output position, plot the output position to display the position on the display section 60.

The operating section 50 is an input device configured to include a touch panel or a button switch, for example, and outputs a signal corresponding to a pressed key or button to the host CPU 40. By the operation of the operating section 50, various kinds of instruction operations, such as a call request, a mail transmission or reception request, and a position calculation request, are input.

The display section 60 is a display device formed by using an LCD (Liquid Crystal Display), for example, and performs various kinds of display on the basis of a display signal input from the host CPU 40. A position display screen, time information, and the like are displayed on the display section 60.

The mobile phone antenna 65 is an antenna used to perform transmission and reception of a radio signal for mobile phones between the mobile phone 1 and a base station provided by a communication service provider of the mobile phone 1.

The radio communication circuit section 70 for a mobile phone is a communication circuit section of a mobile phone configured to include an RF conversion circuit, a baseband processing circuit, and the like and realizes transmission and reception of a call or mail by performing modulation, demodulation, and the like of the radio signal for mobile phones.

The ROM 80 is a read-only nonvolatile storage device and stores a system program which is used when the host CPU 40 controls the mobile phone 1, various programs or data used to realize a position calculation function, and the like.

The RAM 90 is a readable and writable volatile storage device and forms a work area in which a system program executed by the host CPU 40, various processing programs, data processed in various kinds of processing, a processing result, and the like are temporarily stored.

2. Principles

The mobile phone 1 calculates the position by performing a position calculation (hereinafter, referred to as "KF position calculation") using a Kalman filter (hereinafter, referred to as a "KF"). The Kalman filter is an estimation method based on the probability theory of estimating a state function changing with time using an observed value which may include error.

In the present embodiment, a matrix called a state vector X is defined as a state function expressing the state of the mobile phone 1. For example, the state vector X may be expressed as a matrix in the following expression (1) which has as components three-dimensional position (x, y, z), three-dimensional moving speed (u, v, w), three-dimensional acceleration $(a_x, a_y, a_z)$, clock bias b, and clock drift d of the mobile phone 1.

$$X=[x,y,z,u,v,w,a_x,a_y,a_z,b,d]^T \qquad (1)$$

An error covariance matrix P is defined as a matrix which expresses an error included in the state function of the mobile phone 1. The error covariance matrix P is a matrix of '11×11' which expresses the covariance of errors of the components included in the state vector X.

In the KF positioning processing, the mobile phone 1 calculates the position of the mobile phone 1 by performing estimating process and correction process of the state vector X and the error covariance matrix P. In the estimating process, the predicted value $X^-$ of the state vector in current time is calculated by applying a matrix called a state transition matrix $\phi$ to the corrected value $X^+$ of the state vector calculated in the previous correction process.

In the correction process, externally-observed values taken upon the reception of a GPS satellite signal (hereinafter, referred to as "measurement" in the present embodiment) are used as observed values. The observed values are used to calculate the corrected value $X^+$ of the state vector as of the current time by correcting and updating the estimated state vector $X^-$, which is calculated by the estimating process. Specifically, the correction process utilizes a reception frequency and a code phase of a GPS satellite signal received and computed by the measurement acquisition section 33 as the measurement (hereinafter, referred to as an "observed measurement" to indicate this is the measurement observed by the receiver) to make the correction. The measurement is not limited to the reception frequency or the code phase of a GPS satellite signal—other components may replace or be added as the measurement.

In the theory of a Kalman filter, some error is assumed in the observed value to be reflected in the correction process as an observation error (known as a "value R") in correction process. In the present embodiment, since a measurement which includes two components of a code phase and a reception frequency of a GPS satellite signal is made the observed value, error included in each of the two components must be determined.

Figure 2:
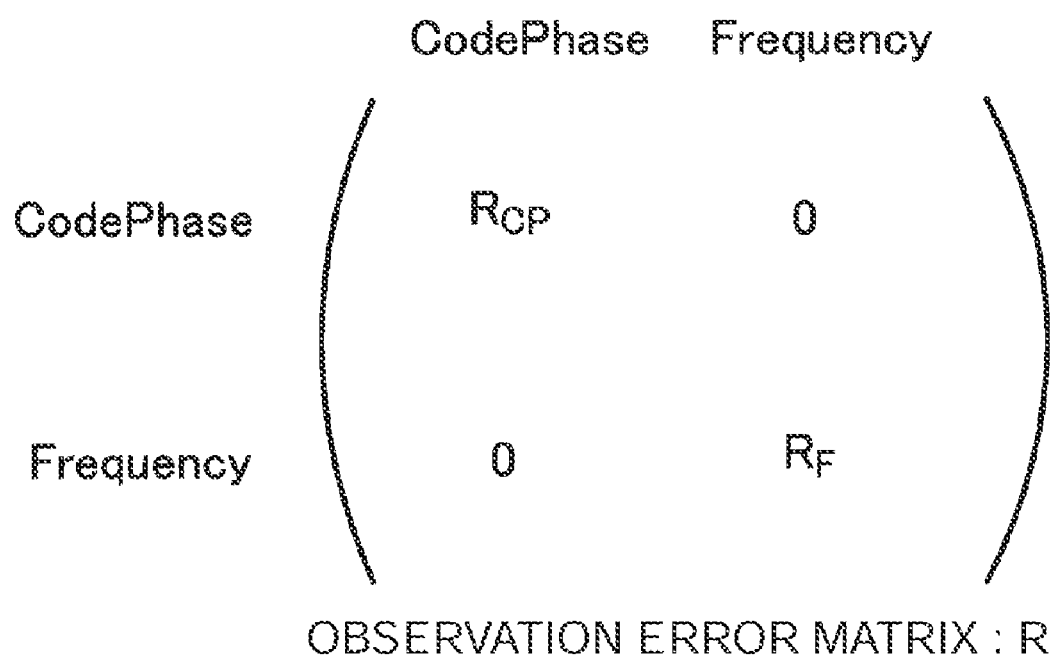
FIG. 2 is a view showing an example of an observation error matrix.

Specifically, assuming that error included in the code phase is a code phase observation error $R_{CP}$ and error included in the reception frequency is a reception frequency observation error $R_F$, an observation error matrix R of 2×2 which is shown in FIG. 2 and has the code phase observation error $R_{CP}$ and the reception frequency observation error $R_F$ as components is defined. Since the observation error is expressed in the form of a matrix in the present embodiment, the observation error is also called an "observation error matrix".

It is known that when the observed value shows a characteristic of white noise, an effective filter can be realized by setting the dispersion $\sigma^2$ of the observed value as an observation error. However, the observed value rarely shows the characteristic of white noise. In practical circumstances, noise components other than the white noise may be included by an influence of bias or drift of a clock provided in the mobile phone 1, an influence of multi-path when receiving a GPS satellite signal, and the like. For this reason, an effective filter cannot necessarily be realized by simply setting the dispersion $\sigma^2$ of the observed value as the observation error.

In order to show that, the inventor of the present application performed the following two experiments. In the first experiment, a measurement is acquired and collected to calculate dispersion $\sigma^2$ of a measurement to calculate the position using the calculated dispersion $\sigma^2$ as an observation error. In the second experiment, error actually included in the measurement ("actual error") is measured and acquired to calculate the position using the actual error of the measurement as an observation error.

The actual error is a difference between the code phase and the reception frequency of a GPS satellite signal observed by the mobile phone 1 ("observed measurement") and the true values of the code phase and the reception frequency of the GPS satellite signal theoretically calculated by a mathematical model ("theoretical measurement"). When information on the position, moving speed, and moving direction of a GPS receiver ("receiver information") is known, the theoretical measurement values can be calculated based on the receiver information, the position of a GPS satellite calculated using the satellite orbit model, and information on the moving speed and the moving direction ("satellite information"), using a known method. Hereinafter, experimental results of the two experiments will be described.

Figure 3:
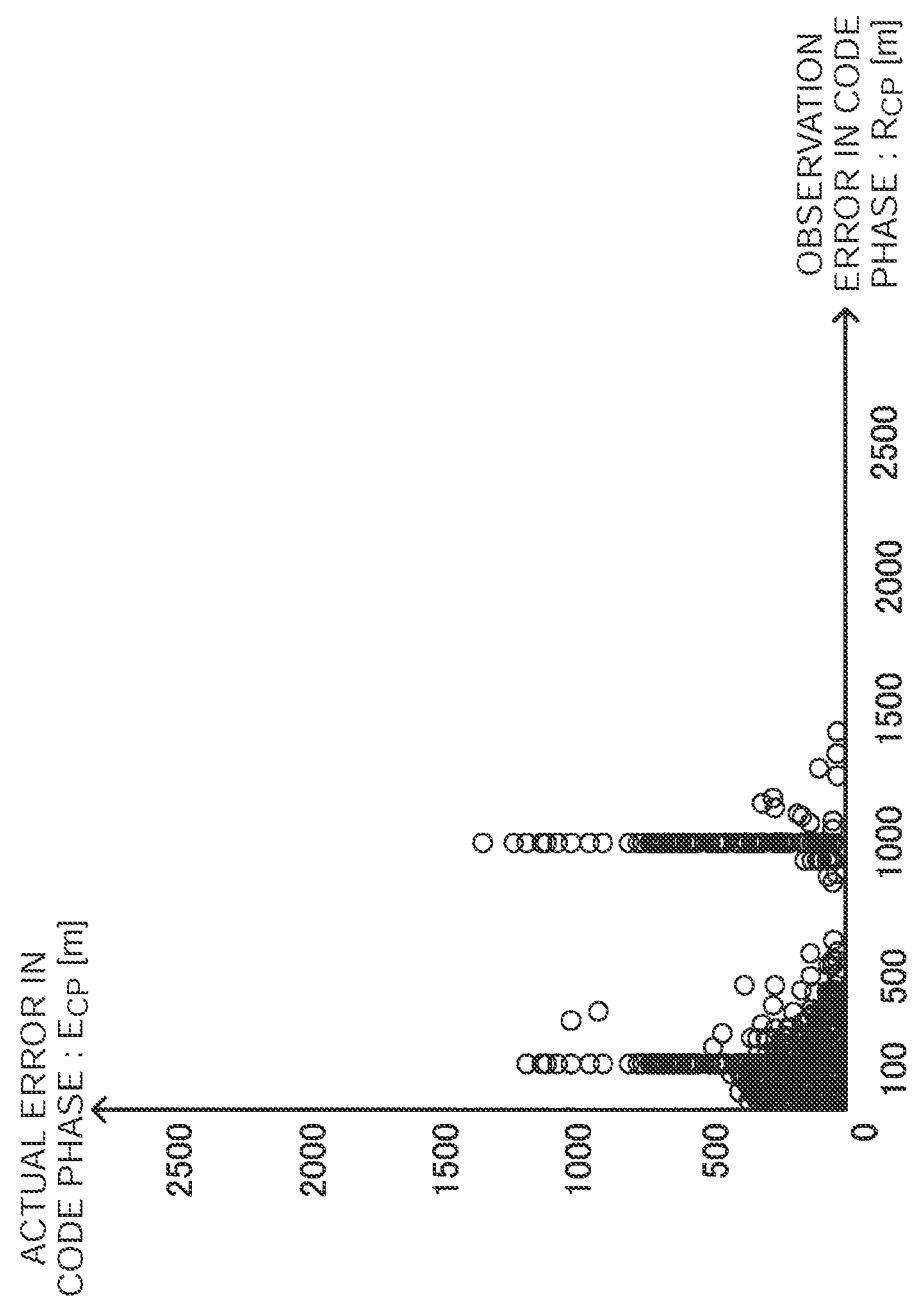
FIG. 3 is a graph showing the relationship between an observation error of a code phase and an actual error of the code phase.
Figure 4:
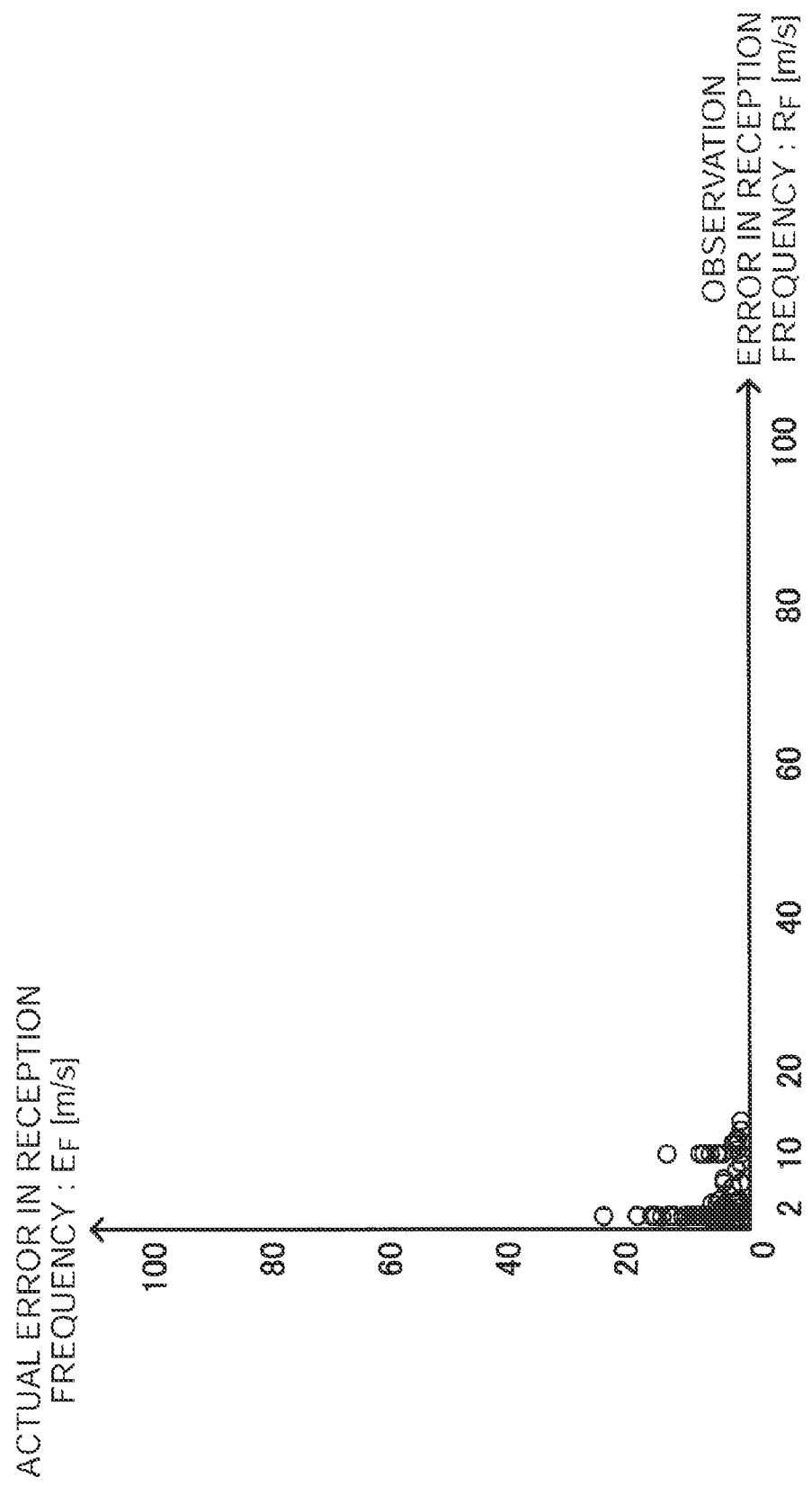
FIG. 4 is a graph showing the relationship between an observation error of a reception frequency and an actual error of the reception frequency.

FIG. 3 is a graph obtained by plotting the magnitude of the code phase observation error $R_{CP}$ set in the observation error matrix R and the magnitude of an actual error $E_{CP}$ of a code phase in a two-dimensional manner in the first experiment. Similarly, FIG. 4 is a graph obtained by plotting the magnitude of the reception frequency observation error $R_F$ and the magnitude of an actual error $E_F$ of a reception frequency in a two-dimensional manner in the first experiment. In FIG. 3, the horizontal axis indicates the code phase observation error $R_{CP}$ and the vertical axis indicates the actual error $E_{CP}$ of the code phase. The code phase observation error $R_{CP}$ and the actual error $E_{CP}$ are expressed in meters [m]. In FIG. 4, the horizontal axis indicates the reception frequency observation error $R_F$ and the vertical axis indicates the actual error $E_F$ of the reception frequency. The reception frequency observation error $R_F$ and the actual error $E_F$ are expressed in meters per second [m/s]. In each drawing, one plot shows a result obtained in one experiment.

From the experimental result of the code phase shown in FIG. 3, it can be seen that the magnitude of the code phase observation error $R_{CP}$ is largely divided into two groups of a group near "100 m" and a group near "1000 m". However, even if the magnitude of the code phase observation error $R_{CP}$ is equal, the plot spreads in a direction of the vertical axis.

Accordingly, it can be seen that the actual error $E_{CP}$ of the code phase has an extensive value.

The same is true for the experimental result of the reception frequency shown in FIG. 4. That is, it can be seen that the magnitude of the reception frequency observation error $R_F$ is largely divided into two groups of a group near "2 m/s" and a group near "10 m/s". However, even if the magnitude of the reception frequency observation error $R_F$ is equal, the actual error $E_F$ of the reception frequency has an extensive value.

Figure 5:
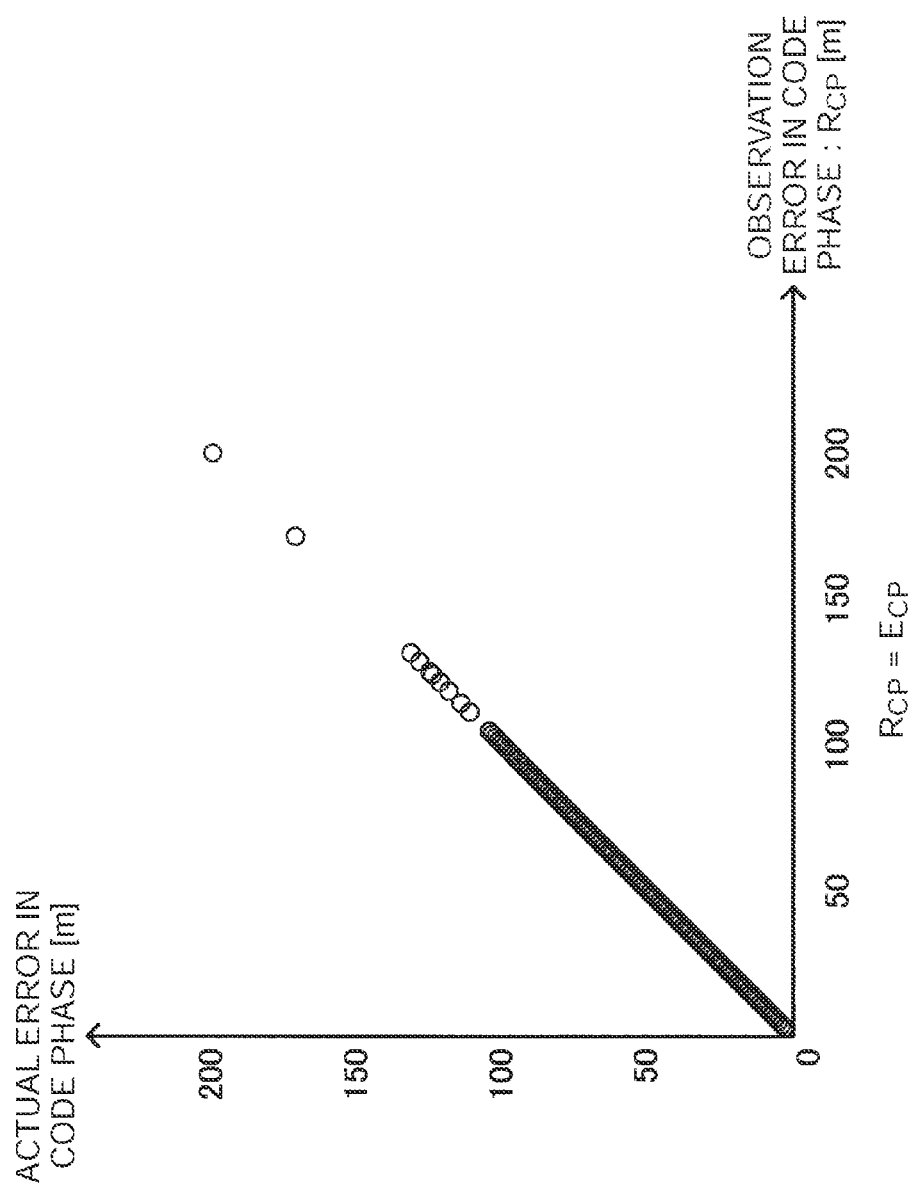
FIG. 5 is a graph showing the relationship between an observation error of a code phase and an actual error of the code phase.

FIG. 5 is a graph obtained by plotting the magnitude of the code phase observation error $R_{CP}$ set in the observation error matrix R and the magnitude of the actual error $E_{CP}$ of a code phase in a two-dimensional manner in the second experiment. In FIG. 5, the horizontal axis indicates the code phase observation error $R_{CP}$ and the vertical axis indicates the actual error $E_{CP}$ of the code phase. From this experimental result, it can be seen that the relationship between $R_{CP}$ and $E_{CP}$ becomes linear by setting the actual error $E_{CP}$ of the code phase to the code phase observation error $R_{CP}$ ($R_{CP}=E_{CP}$).

Figure 6:
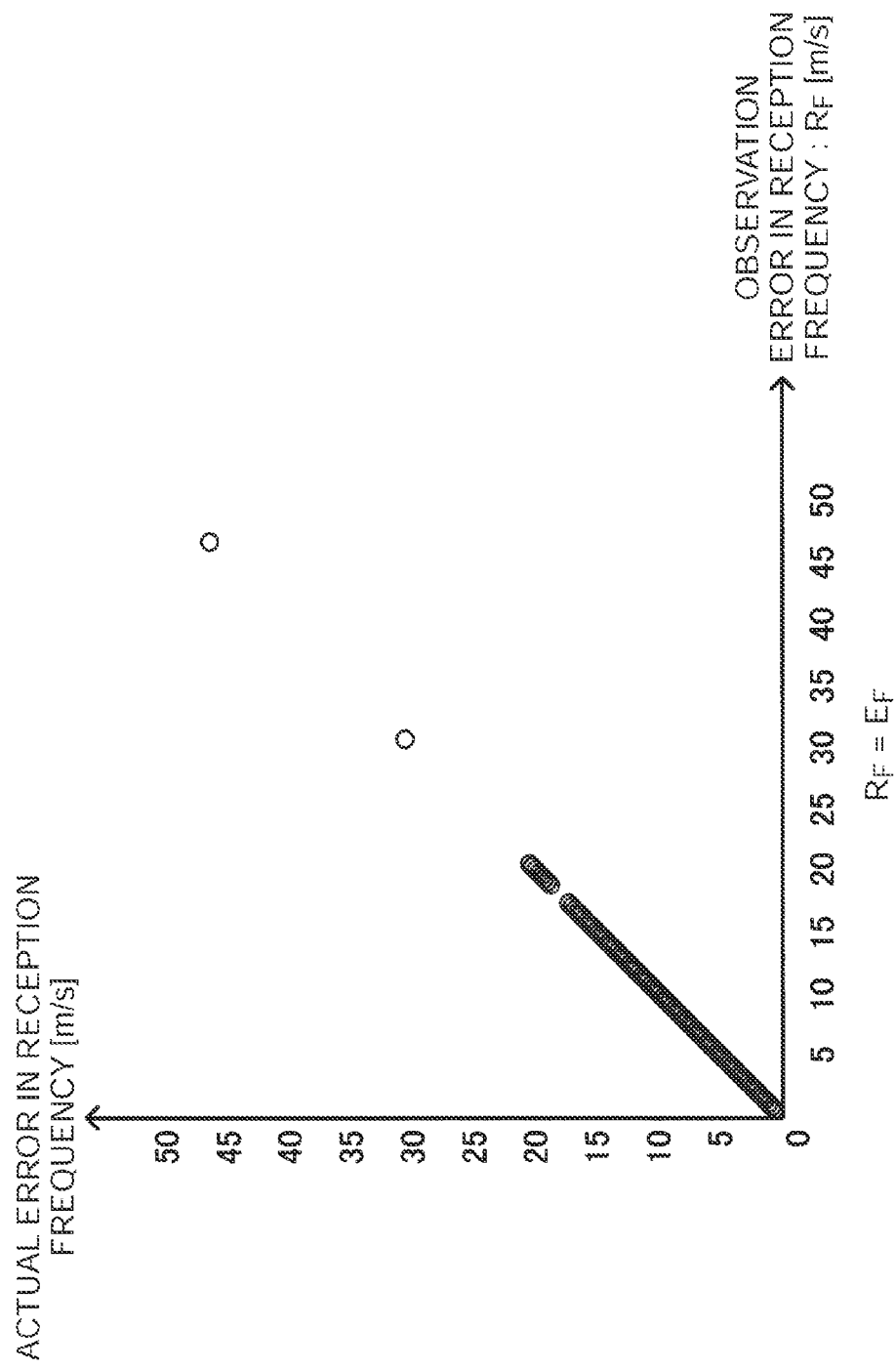
FIG. 6 is a graph showing the relationship between an observation error of a reception frequency and an actual error of the reception frequency.

FIG. 6 is a graph obtained by plotting the magnitude of the reception frequency observation error $R_F$ set in the observation error matrix R and the magnitude of the actual error $E_F$ of the reception frequency in a two-dimensional manner in the second experiment. In FIG. 6, the horizontal axis indicates the reception frequency observation error $R_F$ and the vertical axis indicates the actual error $E_F$ of the reception frequency. Also in this case, the relationship between $R_F$ and $E_F$ becomes linear by setting the actual error $E_F$ of the reception frequency to the reception frequency observation error $R_F$ ($R_F=E_F$).

Figure 7:
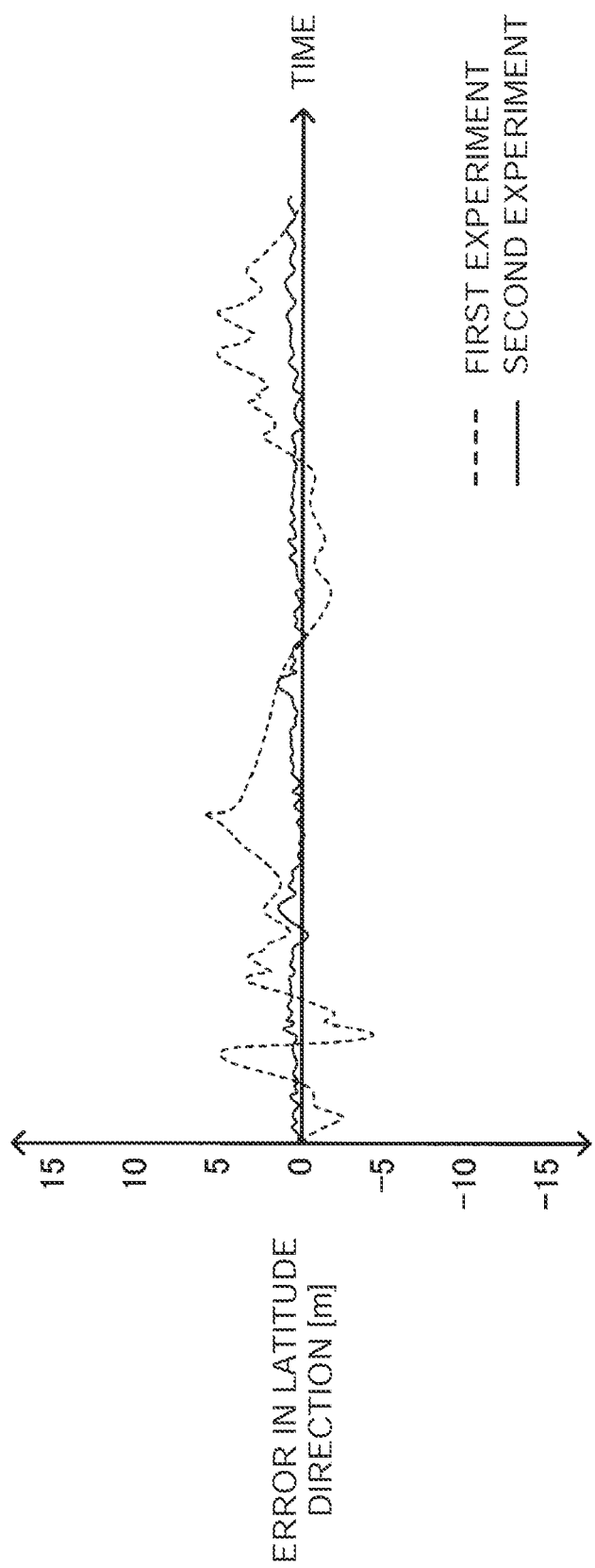
FIG. 7 is a graph showing an error in the latitude direction.
Figure 8:
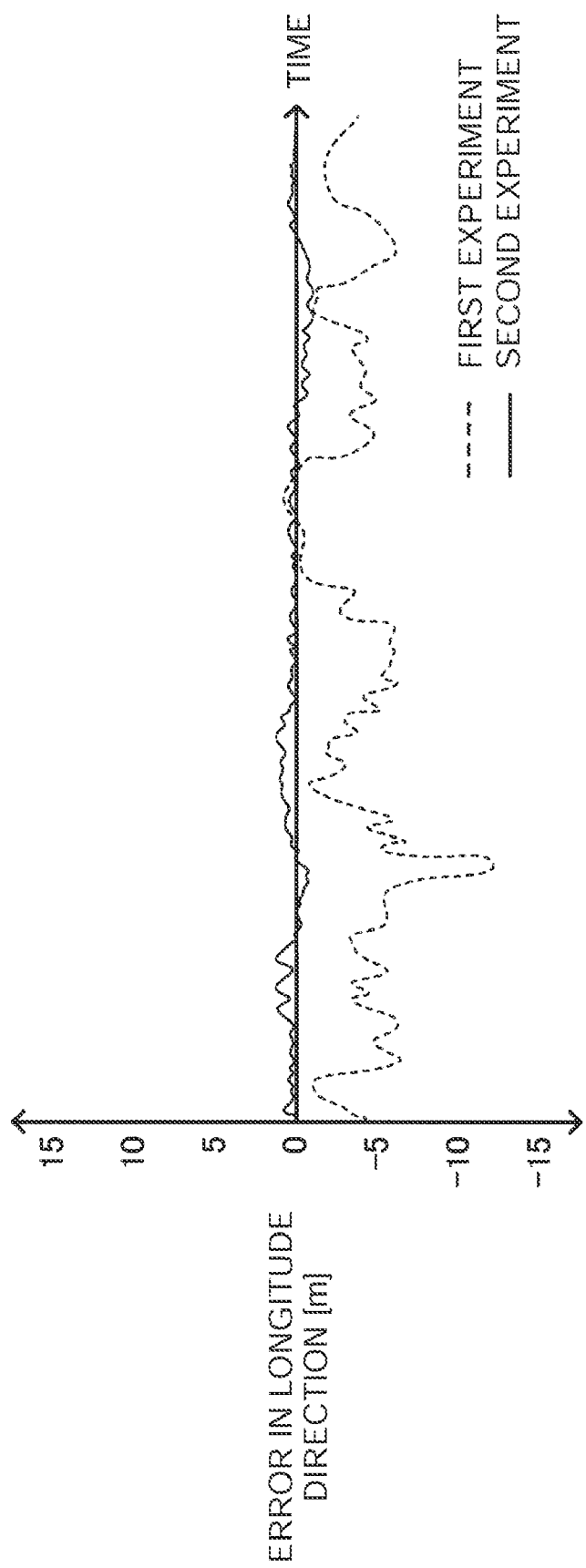
FIG. 8 is a graph showing an error in the longitude direction.
Figure 9:
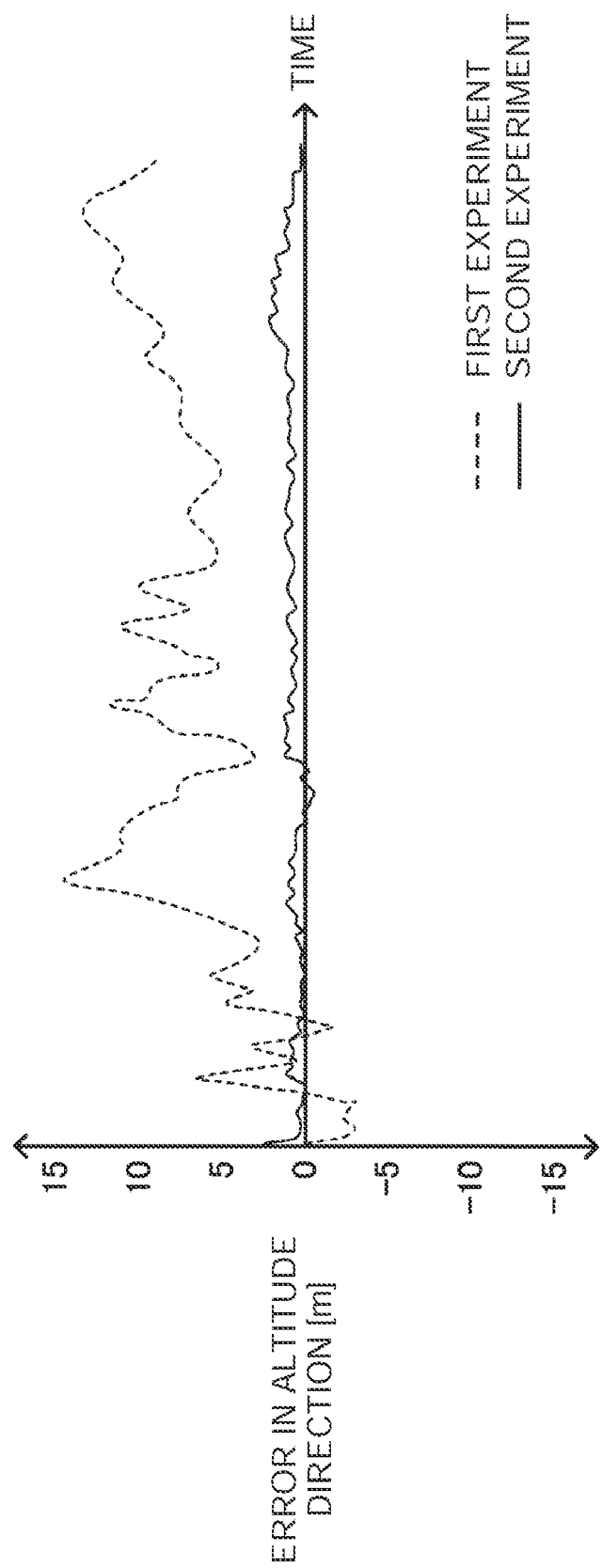
FIG. 9 is a graph showing an error in the altitude direction.

FIGS. 7 to 9 are experimental results showing the magnitude of an error (position error), which is included in the calculated position acquired by position calculation, in each of the first and second experiments. The distance between the calculated position acquired in the position calculation and the actual position of the mobile phone 1 was measured and set as a position error. FIG. 7 shows an error in the latitude direction, FIG. 8 shows error in the longitude direction, and FIG. 9 shows error in the altitude direction. In each of the drawings, the horizontal axis indicates a time and the vertical axis shows the magnitude [m] of error. Error calculated in the first experiment is shown by a dotted line, and error calculated in the second experiment is shown by a solid line.

From these experimental results, in the first experiment, it can be seen that the error largely fluctuates up and down in each of the latitude direction, the longitude direction, and the altitude direction and the position error is large accordingly. On the other hand, from the second experiment, it can be seen that the error is a value near "0" in each of the latitude direction, the longitude direction, and the altitude direction and the position error is small accordingly.

Figures 10, 11:
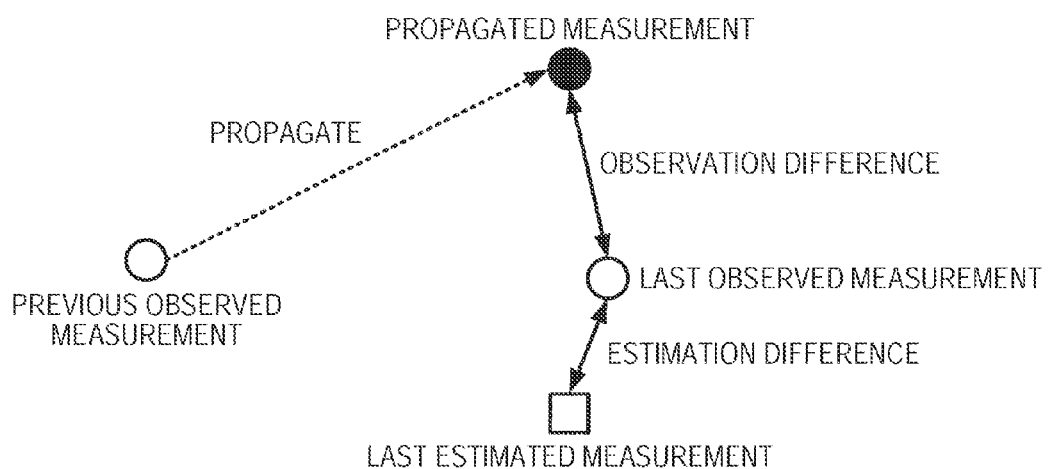
FIG. 10 is a view showing an average position error and an average moving speed error.
FIG. 11 is an explanatory view of a measurement parameter.

FIG. 10 is a view showing the magnitude of an average position error obtained by averaging position errors of all the calculated positions in each of the first and second experiments. In the first and second experiments, not only the position but also the moving speed of the mobile phone 1 was calculated on the basis of a temporal change of the reception frequency of a GPS satellite signal. Accordingly, the magnitude of an average moving speed error obtained by averaging all moving speeds is also shown together in FIG. 10.

This experimental result shows that the average position error is 7.103 m and the average moving speed error is 0.3620 m/s in the first experiment, while the average position error is 0.9699 m and the average moving speed error is 0.1897 m/s in the second experiment. Accordingly, it can be seen that both the errors in the second experimental result are smaller than those in the first experimental result. Especially, it can be seen that the difference between the average position errors is noticeable and the average position error in the second experiment is about 1/10 of that in the first experiment.

From these experimental results, it can be seen that if a parameter showing strong correlation with an actual error of a measurement can be found, it becomes possible to set a suitable observation error using the value of the parameter and the accuracy of position calculation is improved accordingly. For this reason, the inventor of the present application paid attention to three types of parameters and investigated the relationship with an actual error of a measurement using the parameters as first to type 3 measurement parameters.

FIG. 11 is a view for explaining a measurement parameter, and is a conceptual view showing the schematic measurement. In FIG. 11, a white circle indicates the observed measurement. The observed measurement is a measurement observed when a GPS satellite signal is received and is actual measurement values of the code phase and the reception frequency of the GPS satellite signals.

The estimated measurement is a measurement, which is estimated using the theory of a Kalman filter, and is estimated values of the code phase and the reception frequency of the GPS satellite signals. In the present embodiment, the estimated value $HX^-$ of the measurement is calculated by applying a matrix called an observation matrix H to the predicted value $X^-$ of a state vector obtained by performing estimating process.

The observation matrix H is a matrix for estimating the code phase and the reception frequency of a GPS satellite signal, which are measurements, using each component of the predicted value $X^-$ of the state vector and is expressed as a matrix of 2×11 shown in the following expression (2).

$$H = \begin{bmatrix} D_x & D_y & D_z & 0 & 0 & 0 & 0 & 0 & 1 & 0 \\ 0 & 0 & 0 & D_x & D_y & D_z & 0 & 0 & 0 & 1 \end{bmatrix} \quad (2)$$

Here, $D_x$, $D_y$, and $D_z$ included in the observation matrix H are expressed by the following expressions (3-1) to (3-3).

$$D_x = \frac{x_u - x_s}{R} \quad (3\text{-}1)$$

$$D_y = \frac{y_u - y_s}{R} \quad (3\text{-}2)$$

$$D_z = \frac{z_u - z_s}{R} \quad (3\text{-}3)$$

Here, $x_u$, $y_u$, and $z_u$ indicate three-dimensional position components included in the estimated value $X^-$ of the state vector calculated in the estimating process, that is, three-dimensional components of the predicted positions of a GPS receiver. Three-dimensional components of the current position of a captured satellite are indicated as $x_s$, $y_s$, and $z_s$. The current position of the captured satellite can be calculated using a satellite orbit model (for example, ephemeris) and the current time. R is a distance between the predicted position of the GPS receiver and the satellite position of the captured satellite.

Referring back to FIG. 11, among the measurements, an observed measurement acquired immediately prior to the last observed measurement is set as a "prior observed measurement". Using the prior observed measurement, a propagated value, which is the value of the prior measurement propagated to the time at which the last measurement is taken, (hereinafter, referred to as a "propagated measurement") is calculated. Here, propagating is estimating a value using elapsed time. That is, propagating is to estimate measurement to be acquired at a later time (in this example, acquisition time of the last observed measurement) from the observed measurement acquired and calculated at an earlier time.

Specifically, for each of the reception frequency and the code phase, the propagated value of the previous observed measurement is calculated according to the following expressions (4) and (5).

$$F(t) = F(t-1) + \Delta F_d \times \Delta t \quad (4)$$

$$CP(t) = CP(t-1) + \Delta F \times \Delta t \quad (5)$$

In the above equations, F is a reception frequency, CP is a code phase, t is a last measurement acquisition time, t−1 is a previous measurement acquisition time, Δt is a time difference between the last measurement acquisition time and the previous measurement acquisition time, $\Delta F_d$ is a Doppler variation per unit time, and ΔF is a variation of a reception frequency per unit time.

A type 1 measurement parameter is a parameter expressed as a difference between the last observed measurement and the last estimated measurement (hereinafter, referred to as an "estimation difference"). The estimation difference is calculated for each of the code phase and the reception frequency of a GPS satellite signal.

A type 2 measurement parameter is a parameter expressed as a difference between the last observed measurement and the propagated value of the previous observed measurement (hereinafter, referred to as a "propagated measurement"). The last observation difference is calculated for each of the code phase and the reception frequency of a GPS satellite signal.

A type 3 measurement parameter is a reliability degree index XPR (hereinafter, simply referred to as "XPR") which is a kind of parameter for evaluating the signal quality of a GPS satellite signal. The XPR can be calculated according to the following expression (6) using the maximum value $P_1$ of the correlation integral value, which is obtained by performing a correlation operation in the code phase direction by means of the correlation operation section 331, and the maximum correlation integral value $P_2$ among correlation integral values in a code phase distant by ±½ chip or more from the code phase in which the correlation integral value is maximum.

$$XPR = \frac{P_1 - P_2}{P_1} \quad (6)$$

The XPR is a value common to the code phase and the reception frequency.

For the three types of measurement parameters, an experiment was performed in which the values of measurement parameters were actually calculated using the observed measurement acquired and calculated and the estimated measurement calculated in the estimating process and the relationship between the calculated value and an actual error of the measurement was studied. The experimental result is shown below.

Figure 12:
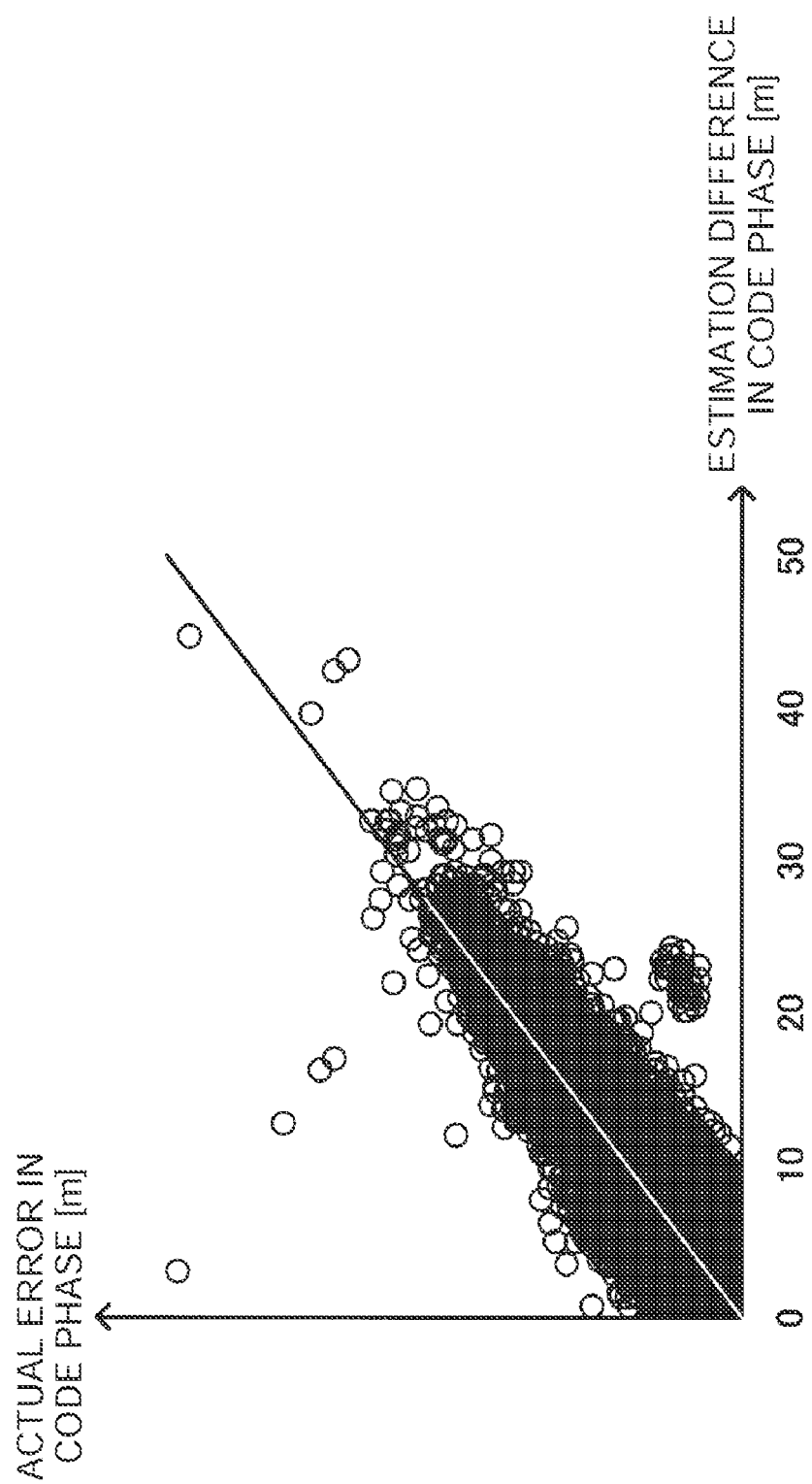
FIG. 12 is a graph showing the relationship between the estimation difference of a code phase and an actual error of the code phase.

FIG. 12 is a graph showing, for a code phase, the relationship between the estimation difference, which is the type 1 measurement parameter, and an actual error of the code phase. One plot shows a result in one measurement. The horizontal axis indicates the estimation difference of the code phase, and the vertical axis indicates the actual error of the code phase. Referring to this graph, the plot spreads toward the upper right direction from the vicinity of the origin. Accordingly, it can be seen that the relationship between the estimation difference and the actual error of the code phase is approximately linear, that is, strong positive correlation is observed.

Figure 13:
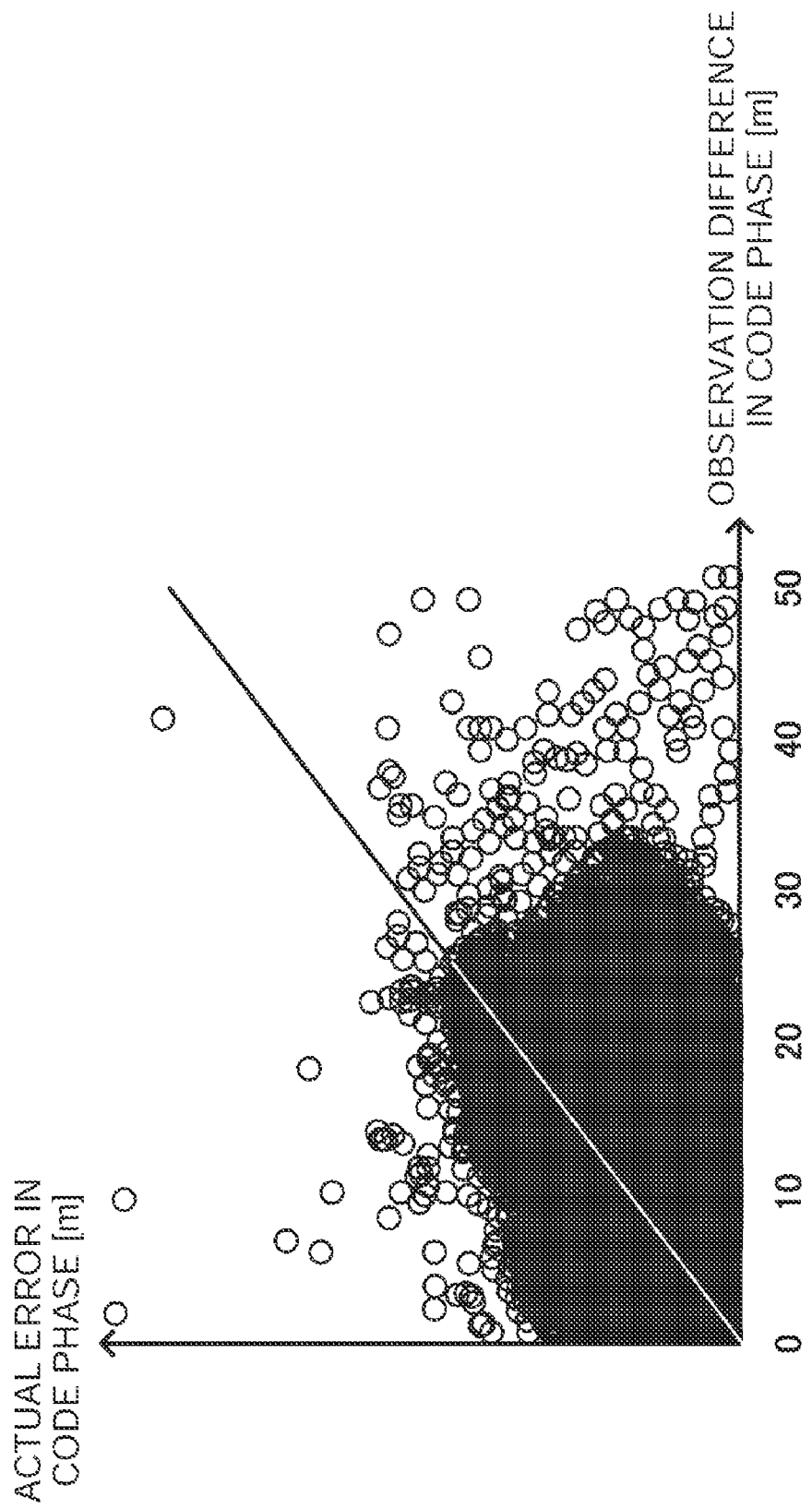
FIG. 13 is a graph showing the relationship between the last observation difference of a code phase and an actual error of the code phase.

FIG. 13 is a graph showing, for a code phase, the relationship between the last observation difference, which is the type 2 measurement parameter, and an actual error of the code phase. One plot shows a result in one measurement. The horizontal axis indicates the last observation difference of the code phase, and the vertical axis indicates the actual error of the code phase. From this graph, it can be seen that the plot does not spread much in the vertical direction but spreads extensively in the horizontal direction. Weak positive correlation is observed in FIG. 13, since the plot spreads toward an upper right direction from the vicinity of the origin even though it is not as much as the result shown in FIG. 12.

Figure 14:
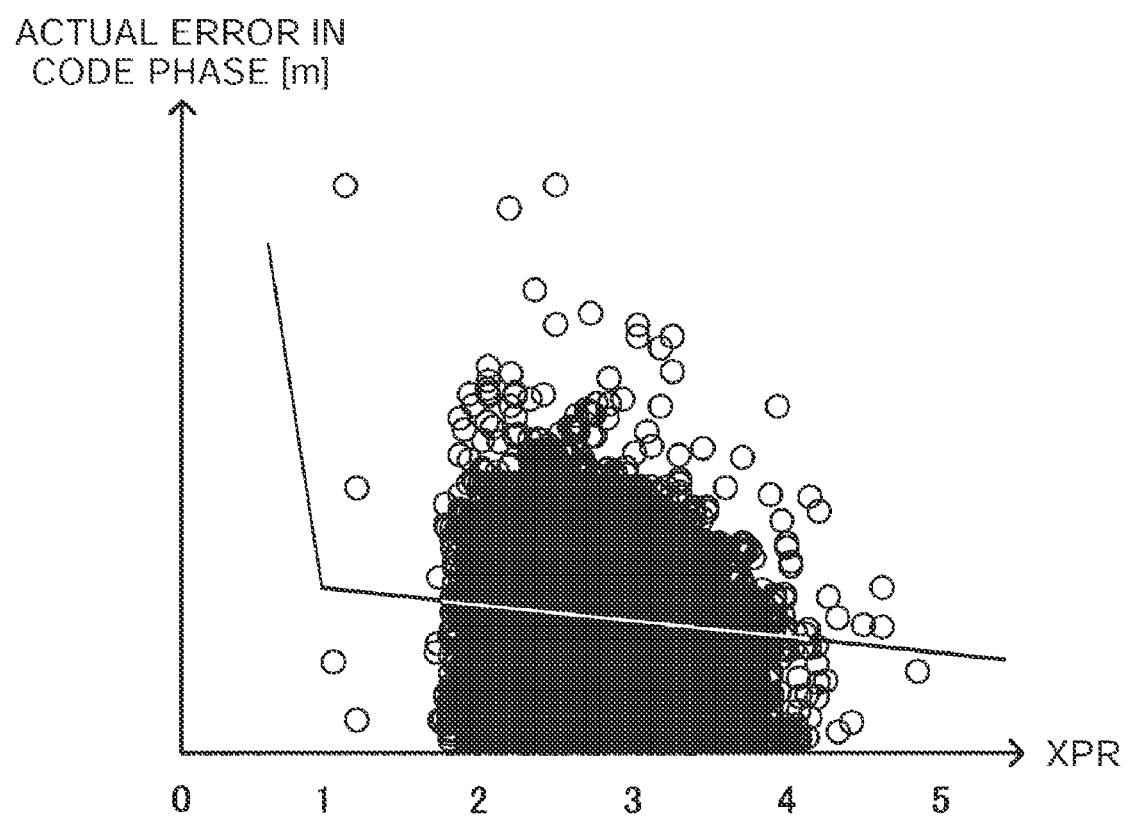
FIG. 14 is a graph showing the relationship between an XPR and an actual error of a code phase.

FIG. 14 is a graph obtained by plotting the XPR, which is the type 3 measurement parameter, and an actual error of a code phase in a two-dimensional manner for the code phase. One plot shows a result in one measurement. The horizontal axis indicates the XPR of the code phase, and the vertical axis indicates an actual error of the code phase. From this graph, it can be seen that the plot does not exist near the origin and concentrates on a middle portion of the graph. Referring to the plot of this middle portion, the plot spreads from the upper left direction to the lower right direction and negative correlation is observed between the XPR and the actual error of a measurement.

Figure 15:
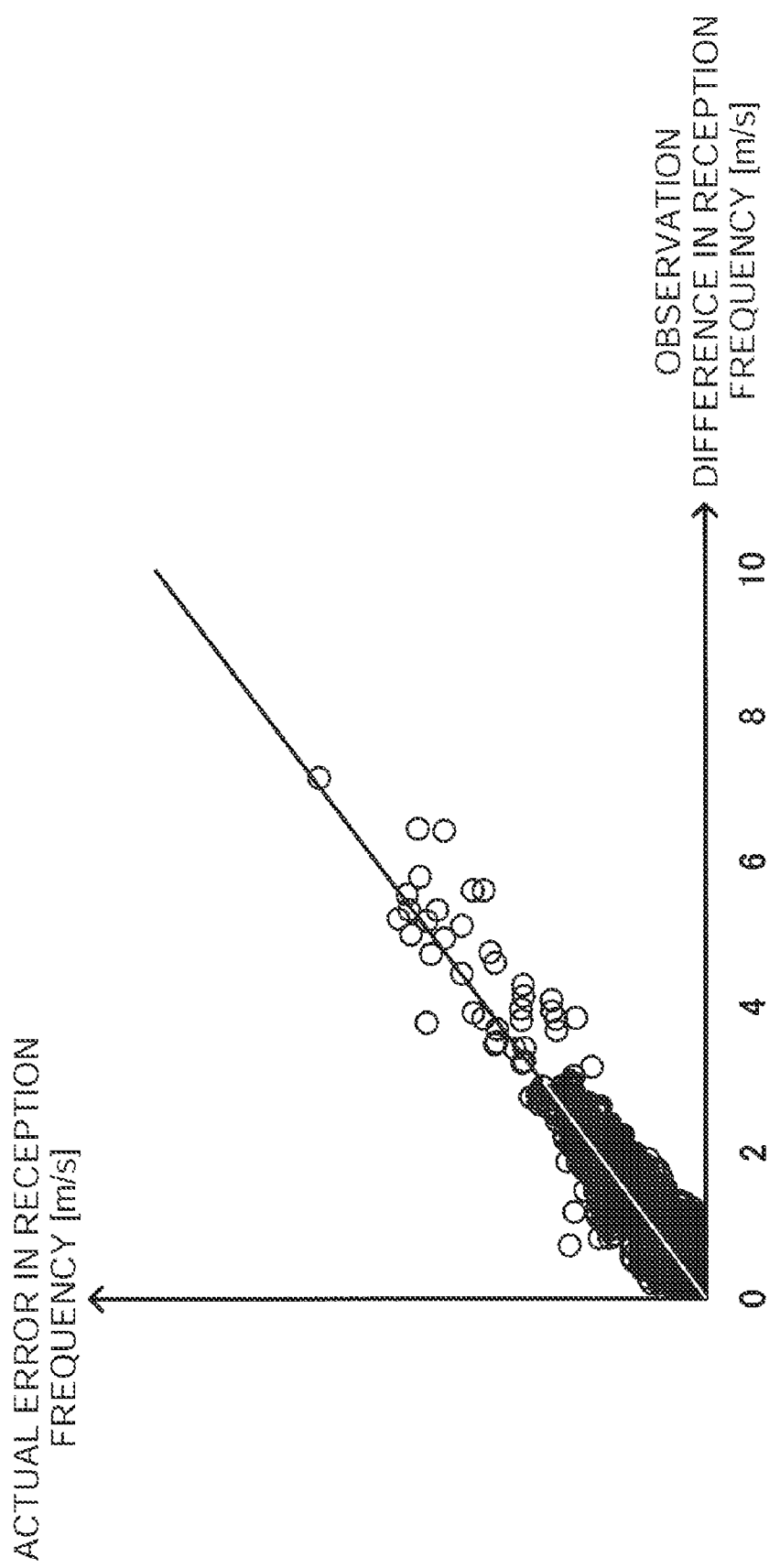
FIG. 15 is a graph showing the relationship between the estimation difference of a reception frequency and an actual error of the reception frequency.
Figure 16:
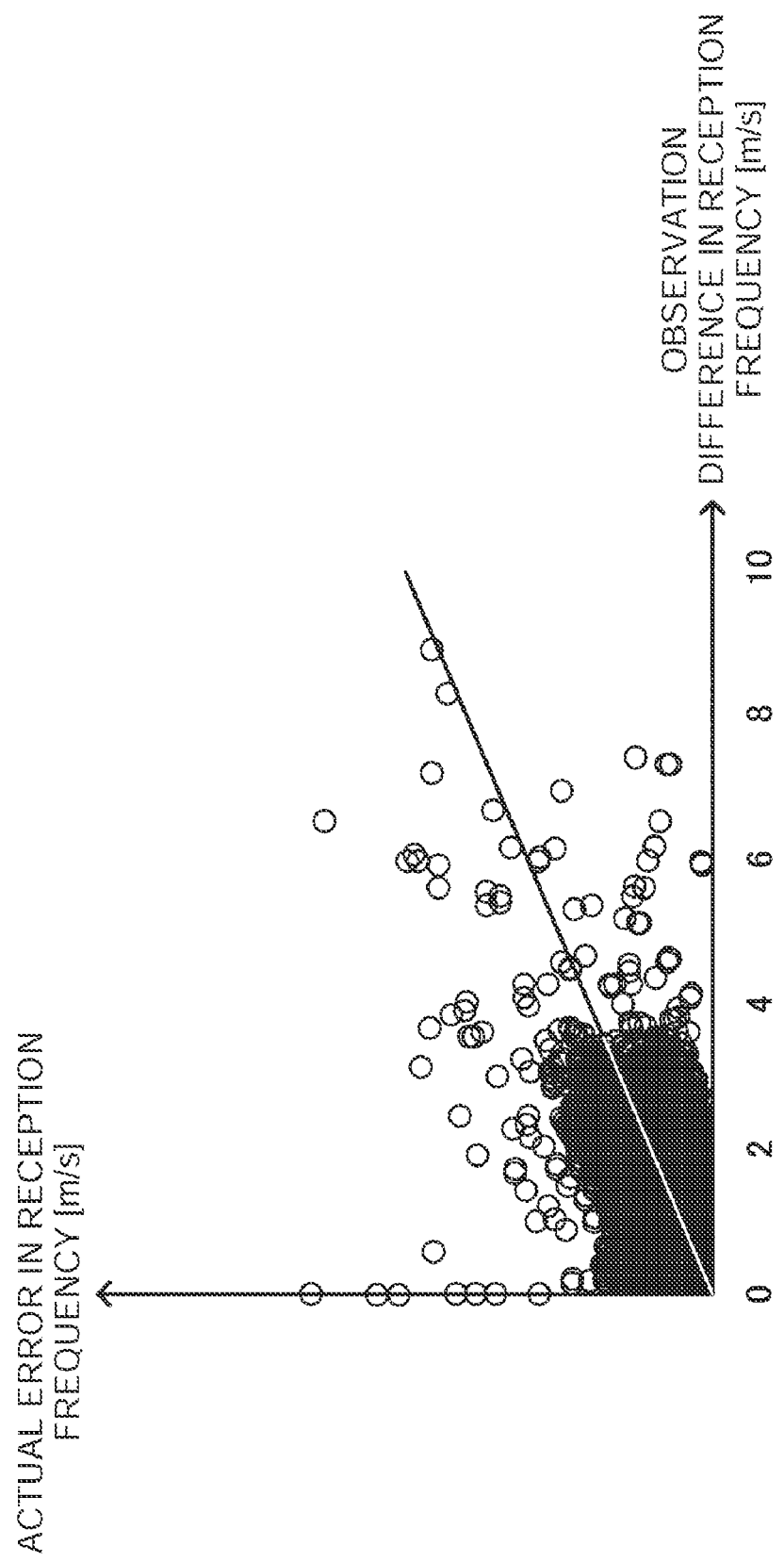
FIG. 16 is a graph showing the relationship between the last observation difference of a reception frequency and an actual error of the reception frequency.
Figure 17:
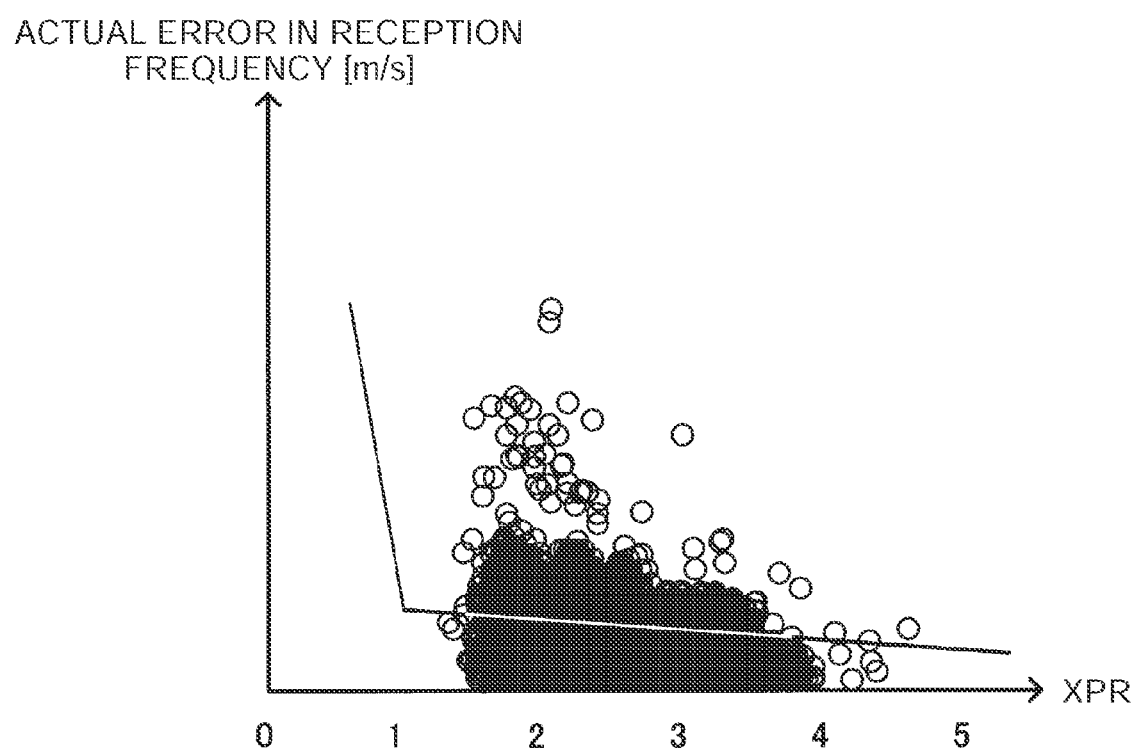
FIG. 17 is a graph showing the relationship between an XPR and an actual error of a reception frequency.

FIGS. 15 to 17 show experimental results when the same experiment was performed for the reception frequency. FIG. 15 is a graph showing the relationship between the estimation difference, which is the type 1 measurement parameter, and the actual error of the reception frequency. FIG. 16 is a graph showing the relationship between the last observation difference, which is the type 2 measurement parameter, and the actual error of the reception frequency. FIG. 17 is a graph showing the relationship between the XPR, which is the type 3 measurement parameter, and the actual error of the reception frequency. From these graphs, it can be seen that the same correlation characteristic as the code phase is also observed for the reception frequency.

From the above experimental result, there is strong positive correlation between the estimation difference, which was the type 1 measurement parameter, and the actual error of the measurement. Also, the last observation difference and the XPR which are the type 2 and type 3 measurement parameters, it could be seen that there is correlation with the actual error of a measurement even though the correlation is not as strong as the type 1 measurement parameter.

Based on the result of the experiments, the inventor has formulated a model equation (hereinafter, referred to as an "expected error model") which defines the corresponding relationship between a measurement parameter and error expected to be contained in the observed measurement (hereinafter, referred to as an "expected error"). The model is used in embodiments of the invention to calculate an expected error which is then used to determine an observation error to be substituted in R in the observation error matrix.

Specifically, using the experimental results shown in FIGS. 12 to 17, an approximate expression in which the distance from all plots becomes the minimum is calculated using the least square method. The approximate expression is determined as the expected error model. For example, an approximate expression expressed as a positive linear function shown in FIG. 12 can be obtained by performing fitting of a function using the least square method for the experimental result of the code phase related to the type 1 measurement parameter shown in FIG. 12. This approximate expression is set as a model equation for calculating the expected error of a code phase using the value of the type 1 measurement parameter, and the same model is also set as approximate expressions related to the type 2 and type 3 measurement parameters. These model equations are comprehensively called an "expected error model".

Similarly, an approximate expression expressed as a positive linear function shown in FIG. 13 can be obtained by performing fitting of a function for the experimental result of the code phase related to the type 2 measurement parameter shown in FIG. 13, and an approximate expression in which two negative linear functions are combined as shown in FIG. 14 can be obtained by performing fitting of a function for the experimental result of the code phase related to the type 3 measurement parameter shown in FIG. 14.

The inventor has found that the expected error model equation differs depending on receiver sensitivity of a GPS receiver. Specifically, for each of the indoor environment and the outdoor environment, the expected error model equation is determined from the relationship between a measurement parameter and an actual error while changing the receiver sensitivity. Then, the expected error model equation is determined by performing fitting of the function described above.

Figure 18:
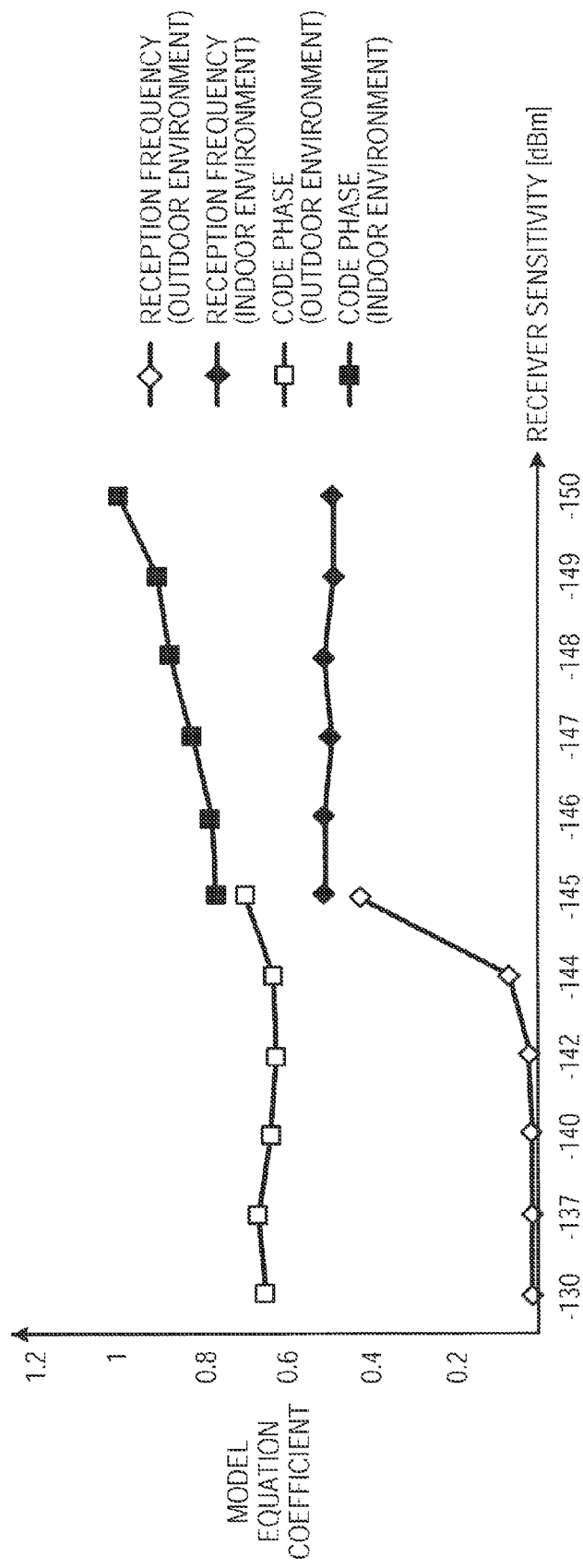
FIG. 18 is a graph showing the relationship between the receiver sensitivity and a model equation coefficient.

FIG. 18 is a graph showing the relationship between the receiver sensitivity of a GPS satellite signal and a coefficient (model equation coefficient) of an expected error model equation. The model equation coefficient shown herein is a first order coefficient (inclination of a linear function) of the expected error model equation acquired for the type 1 measurement parameter. In FIG. 18, the horizontal axis indicates the receiver sensitivity [dBm], and the vertical axis indicates a model equation coefficient. A diamond shows an experimental result regarding the reception frequency. A white diamond is a model equation coefficient calculated in the outdoor environment, and a black diamond is a model equation coefficient calculated in the indoor environment. A rectangle shows an experimental result regarding the code phase. A white rectangle is a model equation coefficient calculated in the outdoor environment, and a black rectangle is a model equation coefficient calculated in the indoor environment.

This result shows that regarding the reception frequency, the model equation coefficient is at the almost same level in the outdoor environment but the model equation coefficient increases gradually as the receiver sensitivity is improved in the indoor environment. Regarding the code phase, it can be seen that the model equation coefficient is at the almost same level in a receiver sensitivity range of −130 dBm to −142 dBm in the outdoor environment but the model equation coefficient increases gradually in a range of −142 dBm to −144 dBm and increases rapidly in a range of −144 dBm to −145 dBm. On the other hand, in the indoor environment, the model equation coefficient is at the almost same level.

This result tells that since a model equation coefficient changes with the receiver sensitivity of a GPS receiver, it is not appropriate to calculate the expected error according to one model equation. That is, this tells that it is appropriate to measure the signal strength of a received GPS satellite signal and to calculate the expected error according to a model equation corresponding to the measured signal strength.

The accuracy of the value of each of the above-described three types of measurement parameters changes according to the receiving environment of a GPS satellite signal. That is, the accuracy of the value of the measurement parameter becomes high if the receiving environment of a GPS satellite signal is good, and the accuracy of the value of the measurement parameter becomes low if the receiving environment of a GPS satellite signal is not good. Since the expected error is calculated by substituting the value of a measurement parameter into the expected error model equation, the accuracy of the expected error depends on the accuracy of the value of the measurement parameter.

Therefore, in the present embodiment, the reliability degree of the calculated expected error is determined on the basis of the value of a measurement parameter. Specifically, the reliability degree expressed in three steps of 1 to 3 is defined as an index value indicating the reliability of the expected error. The lower number means the higher reliability, and "1" means the highest reliability. A reliability degree determination method changes with the type of measurement parameter.

FIG. 19 is a view showing an example of the data configuration of data for reliability degree determination which defines a reliability degree determination method. In the data for reliability degree determination, the reliability degree of 1 to 3 and the types of expected errors are matched with each other. Expected errors calculated using the type 1, type 2 and type 3 measurement parameters are called "type 1 expected error, type 2 expected error, and type 3 expected error", respectively.

As a result of an experiment performed by the inventor of the present application, it could be seen that the estimation difference, which was the type 1 measurement parameter, tended to become extremely large when the mobile phone 1 (GPS receiver) was in a sudden acceleration state. The reason is as follows. When the mobile phone 1 is in the sudden acceleration state, prediction of the state vector X is not performed correctly in the estimating process of a Kalman filter. Accordingly, the accuracy of the predicted value $X^-$ of a calculated state vector is reduced. As a result, since the observation matrix H calculated according to the equations (2) and (3) becomes unsuitable, the accuracy of the predicted value $HX^-$ of a measurement obtained by applying the observation matrix H to the predicted value $X^-$ of the state vector is reduced. Since the estimation difference is a difference between the last observed measurement and the last estimated measurement, the accuracy of the estimation difference is also reduced if the accuracy of the estimated measurement becomes low.

For this reason, regarding the reliability of the type 1 expected error, a predetermined threshold for performing threshold determination on the estimation difference (hereinafter, referred to as a "first threshold") is set. Then, a determination as the reliability degree 1 is made if the estimation difference is smaller than the first threshold, and a determination as the reliability degree 2 is made if the estimation difference is equal to or larger than the first threshold. Prior to a first fix, a determination as the reliability degree 3 is made because a possibility that the prediction of the state vector X will not be performed correctly is high. The reliability of the type 1 expected error is equivalent to the reliability of the estimation difference, and the reliability of the estimation difference is determined by the accuracy of the estimated measurement. Accordingly, the reliability of the type 1 expected error can also mean the reliability of the estimated measurement.

Next, reliability of the type 2 expected error will be described. Referring to the graphs shown in FIGS. 13 and 16, it can be seen that in a region where the last observation difference is small, actual errors of a measurement are extensively distributed in the vertical direction and the variation width of the actual error is large. That is, in a region where the last observation difference is small, the convergence of the actual error is not good. From this, it is thought that when the last observation difference is small, the accuracy of the expected error calculated according to a expected error model equation is reduced.

For this reason, regarding the type 2 measurement parameter, a predetermined threshold for performing threshold determination on the last observation difference (hereinafter, referred to as a "second threshold") is set. Then, adjustment to the reliability degree 1 is performed if the calculated estimation difference is equal to or larger than the second threshold, and adjustment to the reliability degree 2 is performed if the last observation difference is smaller than the second threshold. When the previous observed measurement cannot be acquired, it is not possible to calculate the last observation difference. Therefore, in this case, a determination as the reliability degree 3 is made since it is not possible to calculate the expected error. The reliability of the type 2 expected error is equivalent to the reliability of the last observation difference, and the reliability of the last observation difference is determined by accuracy of the propagate value of a measurement. Accordingly, the reliability of the type 2 expected error can also mean the reliability of the propagate value.

Regarding reliability of the type 3 expected error, it can be said that the signal quality is high as the XPR increases because the rate of a noise component included in a received GPS satellite signal is low, and the signal quality is low as the XPR decreases because the rate of a noise component included in a received GPS satellite signal is high. For this reason, a predetermined threshold for performing threshold determination on the XPR (hereinafter, referred to as a "third threshold") is set. Then, a determination as the reliability degree 1 is made if the calculated XPR is equal to or larger than the third threshold, and a determination as the reliability degree 2 is made if the XPR is equal to or smaller than the third threshold. The reliability of the type 3 expected error is equivalent to the reliability of the XPR.

After the reliability of the expected error is determined according to the determination method described above, the priorities are given to the type 1 to type 3 expected errors. Although it will be described in detail in the second embodiment, basically, the priority of the type 1 expected error is set to be highest. However, the reliability degree of the type 1 expected error may be low. In this case, the priority of the type 2 expected error is set high. When the reliability degree of the type 2 expected error is low, the priority of the type 3 expected error is set high.

After the priorities are determined, the value of an observation error set in the observation error matrix R is determined using the expected error with a highest priority level. Specifically, regarding the code phase, the square value of the expected error with a highest priority level is calculated and set as a code phase observation error $R_{CF}$. Regarding the reception frequency, the square value of the expected error with a highest priority level is calculated and set as the reception frequency observation error $R_F$.

3. First Embodiment

A first embodiment is an embodiment in which the observation error matrix R is set by using only the type 1 expected error among the type 1 to 3 expected errors explained in the principle and the position is calculated by performing the position calculation using the Kalman filter.

3-1. Data Configuration

Figure 20:
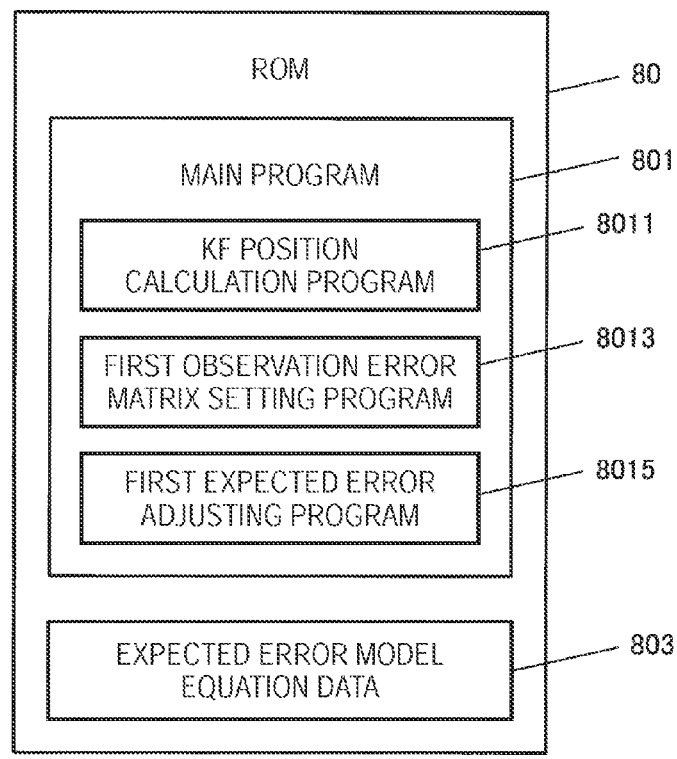
FIG. 20 is a view showing an example of the data stored in a ROM in a first embodiment.

FIG. 20 is a view showing an example of the data stored in the ROM 80 of the mobile phone 1 in the first embodiment. A main program 801, which is read by the host CPU 40 and is executed as main processing (refer to FIG. 24), and a expected error model equation data 803 are stored in the ROM 80. A KF position calculation program 8011 executed as KF position calculation (refer to FIG. 25), a first observation error matrix setting program 8013 executed as first observation error matrix setting processing (refer to FIG. 26), and a first expected error adjusting program 8015 executed as first expected error adjusting processing (refer to FIG. 27) are included as a subroutine in the main program 801.

The main processing includes not only the processing that the host CPU 40 performs to realize the original function as a mobile phone, such as call processing or mail transmission and reception processing, but also processing that the host CPU 40 performs in order to calculate the position of the mobile phone 1 by performing the KF position calculation.

The KF position calculation is processing when the host CPU 40 calculates the position of the mobile phone 1 by performing estimating process and correction process on the state vector X, which includes the position and the moving speed of the mobile phone 1, on the basis of the theory of a Kalman filter and displays the calculated position as an output position on the display section 60.

The first observation error matrix setting processing is processing when the host CPU 40 sets the observation error matrix R, which is a kind of KF parameter used in the correction process of the KF position calculation, according to the principle described above.

The first expected error adjusting processing is processing when the host CPU 40 adjusts a expected error using the average value of expected errors used in the past position calculation if it is determined that the reliability degree of the expected error calculated in the first observation error matrix setting processing is low. Details of the processing will be described later using a flow chart.

FIG. 22 is a view showing an example of the data configuration of the expected error model equation data 803. In the expected error model equation data 803, a expected error model equation 8033 for calculating the expected error is stored for each of the code phase and the reception frequency, which are observed measurements, so as to match the signal strength 8031 of a GPS satellite signal.

In the expected error model equation 8033, $E_{CP}$ indicates the code phase expected error, and $E_F$ indicates the reception frequency expected error. x indicates a measurement parameter. In the present embodiment, the estimation difference corresponds to this. Here, "a ($a_1$, $a_2$, $a_3$, ... )" and "b ($b_1$, $b_2$, $b_3$, ... )" indicate 1st and 0-th order coefficients of a model equation for a code phase, that is, inclination and intercept of the model equation, respectively. Similarly, "c ($c_1$, $c_2$, $c_3$, ... )" and "d ($d_1$, $d_2$, $d_3$, ... )" indicate 1st and 0-th order coefficients of a model equation for a reception frequency, respectively.

For example, when the signal strength of a GPS satellite signal is −132 dBm, the code phase expected error $E_{CP}$ is calculated according to a first order model equation of $E_{CP}=a_3x+b_3$ for the code phase, and the reception frequency expected error $E_F$ is calculated according to a first order model equation of $E_F=c_3x+d_3$ for the reception frequency.

Figure 21:
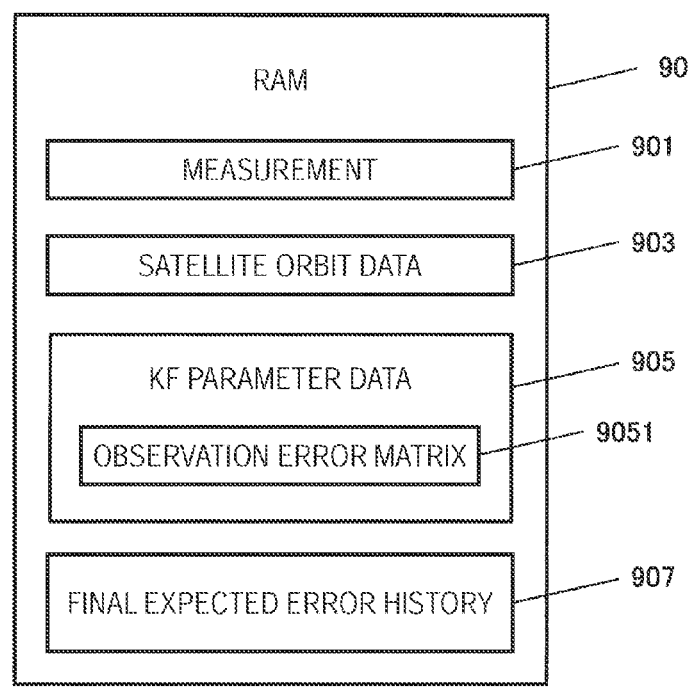
FIG. 21 is a view showing an example of the data stored in a RAM in the first embodiment.

FIG. 21 is a view showing an example of the data stored in the RAM 90 of the mobile phone 1 in the first embodiment. Measurement data 901, satellite orbit data 903, KF parameter data 905, and final expected error history data 907 are stored in the RAM 90.

FIG. 23 is a view showing an example of data configuration of the measurement data 901. For each captured satellite 9011, a observed measurement 9013, which is the observed values of a code phase and a reception frequency of a GPS satellite signal acquired and calculated by the measurement acquisition operation section 33, and a estimated measurement 9015, which is the predicted values of the code phase and the reception frequency of the GPS satellite signal predicted in the KF position calculation, are stored in the measurement data 901 so as to match each other.

For example, regarding a satellite S1 of the captured satellite 9011, the code phase is CP11 and the reception frequency is F11 in the case of the observed measurement 9013 acquired and calculated by the measurement acquisition operation section 33, and the code phase is CP21 and the reception frequency is F21 in the case of the estimated measurement 9015.

The satellite orbit data 903 is data in which the satellite orbit information on a GPS satellite is stored. An almanac showing the rough satellite orbit of each GPS satellite and an ephemeris showing the detailed satellite orbit of each GPS satellite are included in the satellite orbit data 903. The satellite orbit data 903 may be acquired by decoding a GPS satellite signal received from a GPS satellite or may be acquired by server assistance from a base station, for example.

The KF parameter data 905 is data of a KF parameter which is updated as necessary by estimating process and correction process in the KF position calculation. For example, the values of the state vector X and the error covariance matrix P are included in the KF parameter data 905. Particularly in the present embodiment, the observation error matrix R 9051 is included in the KF parameter data 905.

The final expected error history data 907 is history data of the expected error (hereinafter, referred to as a "final expected error") calculated as a final expected error by the first expected error adjusting processing. The final expected error calculated in the past for each of the code phase and the reception frequency of a GPS satellite signal is stored in the final expected error history data 907.

3-2. Flow of Processing

Figure 24:
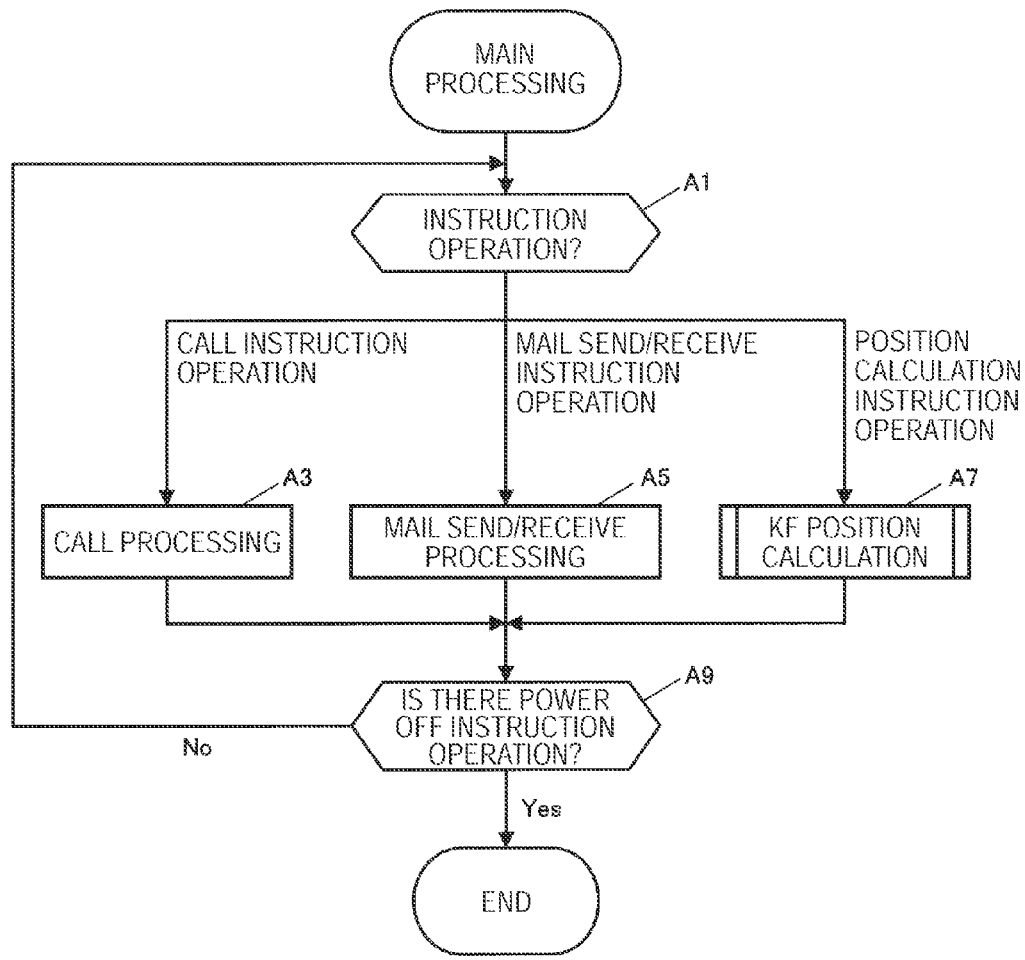
FIG. 24 is a flow chart showing the flow of main processing.

FIG. 24 is a flow chart showing the flow of main processing, which is executed in the mobile phone 1, by reading and executing the main program 801 stored in the ROM 80 by means of the host CPU 40. The main processing is processing which starts when the host CPU 40 detects that the user has performed a power supply operation on the mobile phone 1 through the operating section 50.

Although not particularly described, it is assumed that being under execution of the main processing is a state where receiving of an RF signal using the GPS antenna 10, down-conversion to an IF signal using the RF receiving circuit section 21, and acquisition and calculation of a reception frequency or a code phase (observed measurement) of a GPS satellite signal using the measurement acquisition operation section 33 are performed as necessary.

First, the host CPU 40 determines an instruction operation performed through the operating section 50 (step A1). When the instruction operation is determined to be a call instruction operation (step A1; call instruction operation), call processing is performed (step A3). Specifically, the host CPU 40 prompts the radio communication circuit section 70 for a mobile phone to perform base station communication with a radio base station, so that a call between the mobile phone 1 and another apparatus is realized.

When it is determined that the instruction operation is a mail transmission/reception instruction operation in step A1 (step A1; mail transmission/reception instruction operation), the host CPU 40 performs mail transmission/reception processing (step A5). Specifically, the host CPU 40 prompts the radio communication circuit section 70 for a mobile phone to perform base station communication, so that transmission and reception of a mail between the mobile phone 1 and another apparatus is realized.

When the instruction operation is determined to be a position calculation instruction operation in step A1 (step A1; position calculation instruction operation), the host CPU 40 performs KF position calculation by reading and executing the KF position calculation program 8011 stored in the ROM 80 (step A7).

Figure 25:
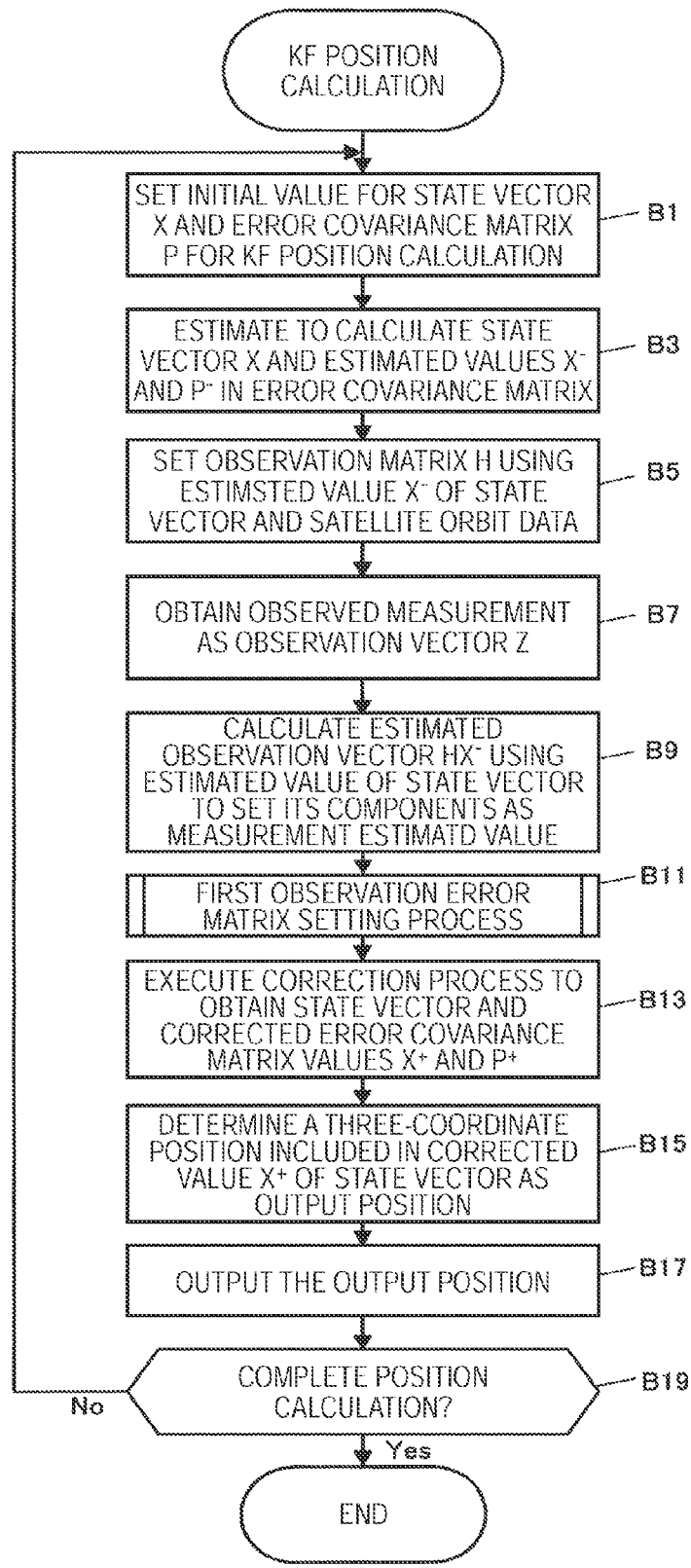
FIG. 25 is a flow chart showing the flow of KF position calculation.

FIG. 25 is a flow chart showing the flow of KF position calculation.

First, the host CPU 40 sets the initial values of the state vector X and the error covariance matrix P for KF position calculation (step B1). For example, the corrected values $X^+$ and $P^+$ of the state vector X and error covariance matrix P calculated in the previous correction process may be set as the initial values of the state vector X and the error covariance matrix P.

Then, the host CPU 40 calculates the predicted value $X^-$ of the state vector and the estimated value $P^-$ of the error covariance matrix by performing estimating process on the state vector X and the error covariance matrix P according to the following expressions (7) and (8) (step B3).

$$X^-(t) = \phi(t)X^+(t-1) \tag{7}$$

$$P^-(t) = \phi(t)P^+(t-1)\phi^T(t) + Q(t-1) \tag{8}$$

Here, a suffix '−' in each expression denotes a predicted value, a suffix '+' denotes a corrected value, and a suffix 'T' denotes a transposed matrix. Here, "$\phi$" is a matrix of 11×11 expressing the transition of the state vector X called a state transition matrix, and "Q" is a matrix of 11×11 which determines the tolerance of a change of each component included in the state vector X called a system noise matrix. The state transition matrix $\phi$ and the system noise matrix Q can be calculated as fixed values, for example.

Then, the host CPU 40 sets the observation matrix H according to the expressions (2) and (3) (step B5). Specifically, the host CPU 40 calculates the satellite position of the captured satellite using the current time and the satellite orbit data 903 stored in the RAM 90. Then, the values of $D_x$, $D_y$, and $D_z$ are calculated according to the expressions (3-1) to (3-3) using the predicted position of the mobile phone 1 calculated in the estimating process of step B3 and the satellite position of the captured satellite, and the observation matrix H is set according to the expression (2) using these values.

Then, the host CPU 40 acquires a code phase and a reception frequency of a GPS satellite signal from each captured satellite from the measurement acquisition operation section 33, and stores them as the observed measurement 9013 in the measurement data 901 of the RAM 90 and sets as an observation vector Z a matrix of 2×1 including the observed measurement 9013 (step B7).

Then, the host CPU 40 calculates a predicted observation vector $HX^-$ by multiplying the predicted value $X^-$ of the state vector calculated in step B3 by the observation matrix H set in step B5. Then, the predicted values of the code phase and the reception frequency of the GPS satellite signal, which are components of the predicted observation vector $HX^-$, are stored as the estimated measurement 9015 in the measurement data 901 (step B9).

Then, the host CPU 40 performs first observation error matrix setting processing by reading and executing the first observation error matrix setting program 8013 stored in the ROM 80 (step B11).

Figure 26:
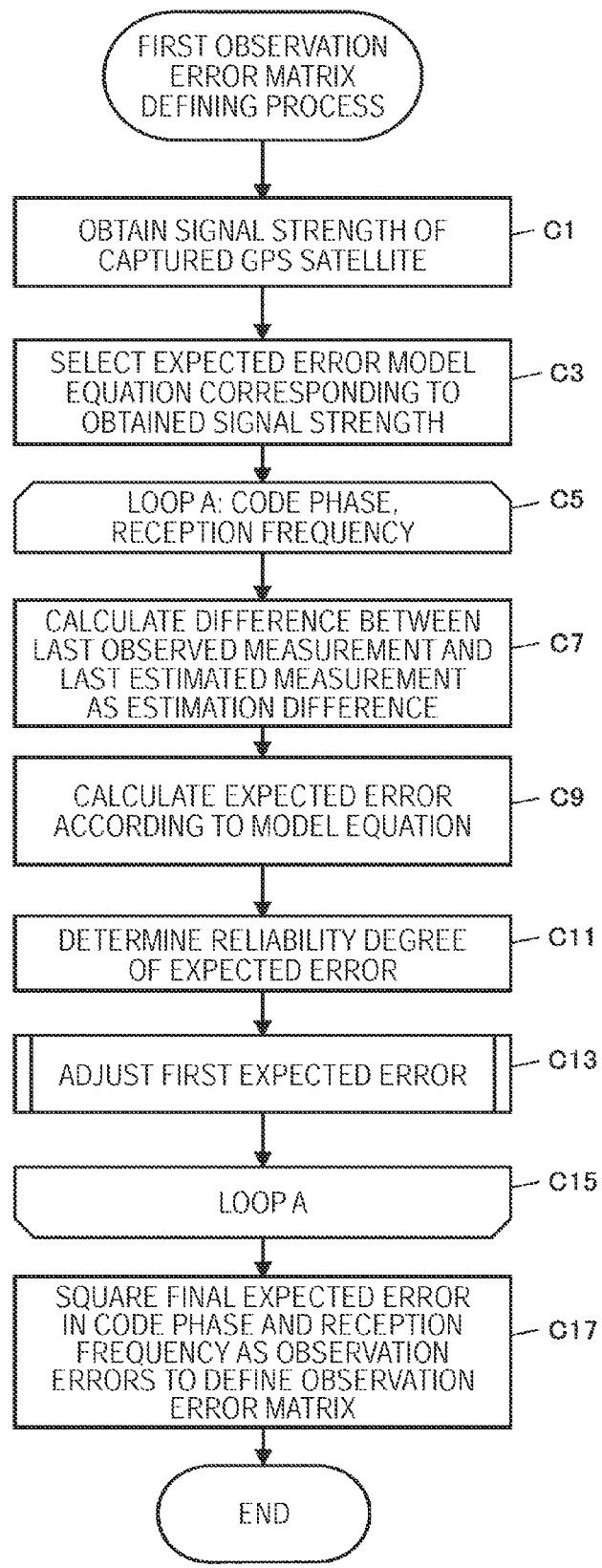
FIG. 26 is a flow chart showing the flow of first observation error matrix setting processing.

FIG. 26 is a flow chart showing the flow of the first observation error matrix setting processing.

First, the host CPU 40 acquires the signal strength of a captured GPS satellite signal from the measurement acquisition operation section 33 (step C1). Then, the host CPU 40 selects the expected error model equation 8033, which corresponds to the acquired signal strength 8031, referring to the expected error model equation data 803 stored in the ROM 80 (step C3).

Subsequently, the host CPU 40 executes processing of loop A for each of the code phase and the reception frequency (steps C5 to C15). In the processing of the loop A, the host CPU 40 calculates a difference between the last observed measurement 9013, which is stored in the measurement data 901 of the RAM 90, and the last estimated measurement 9015 and sets the difference as a estimation difference (step C7). Then, using the calculated estimation difference, the host CPU 40 calculates the expected error according to the expected error model equation selected in step C1 (step C9).

Then, the host CPU 40 determines the reliability degree of the expected error calculated in step C9 (step C11). Specifically, the host CPU 40 determines to which of "1" to "3" the reliability degree of the calculated expected error corresponds by performing threshold determination on the estimation difference according to a determination method of the reliability degree of the type 1 measurement parameter included in the data for reliability degree determination shown in FIG. 19.

Then, the host CPU 40 performs the first expected error adjusting processing by reading and executing the first expected error adjusting program 8015 stored in the ROM 80 (step C13).

Figure 27:
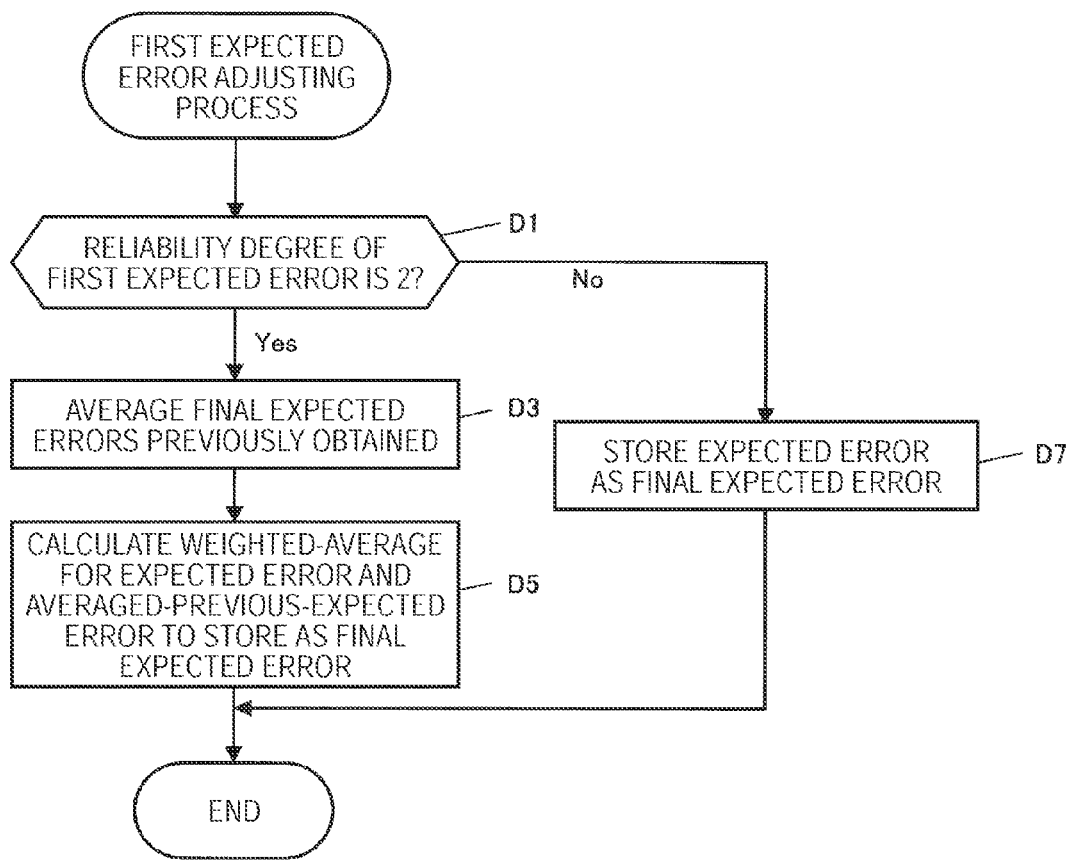
FIG. 27 is a flow chart showing the flow of first expected error adjusting processing.

FIG. 27 is a flow chart showing the flow of the first expected error adjusting processing.

First, the host CPU 40 determines whether or not the reliability degree of the first expected error is 2 (step D1). If it is determined that the reliability degree of the first expected error is 2 (step D1; Yes), the average value (hereinafter, referred to as a "past average value") of final expected errors calculated in the past is calculated referring to the final expected error history data 907 stored in the RAM 90 (step D3).

Then, the host CPU 40 performs weighted average calculation of the expected error and the past average value and stores the calculated value as a final expected error in the final expected error history data 907 (step D5). When the reliability degree of the expected error is 2, the expected error is adjusted using the final expected error calculated in the past since the reliability degree of the expected error is low. Specifically, the weighted average calculation is performed in a state where the weight of the expected error is set to $\alpha$ and the weight of the past average value is set to $1-\alpha$. The weight $\alpha$ is expressed as a value in a range of 0 to 1. For example, the calculation may be performed in a state where the weight is set to a fixed value ($\alpha$=0.5).

On the other hand, if it is determined that the reliability degree of the first expected error is not 2 but 1 or 3 in step D1 (step D1: No), the host CPU 40 stores the expected error as a final expected error in the final expected error history data 907 (step D7).

When the reliability degree of the expected error is 1, it can be said that the reliability degree of the expected error is high. Accordingly, the expected error is set as a final expected error without adjusting the expected error. When the reliability degree of the expected error is 3, it is before First Fix. Accordingly, it can be said that the reliability degree of the expected error is low. In this case, however, the past expected error does not exist and the expected error cannot be adjusted. For this reason, the expected error is set as the final expected error.

After performing the processing of step D5 or D7, the host CPU 40 ends the first expected error adjusting processing.

After returning to the first observation error matrix setting processing of FIG. 26 to perform the first expected error adjusting processing, the host CPU 40 moves the processing to the next type of measurement. Then, after performing the processing of steps C7 to C13 for each of the code phase and the reception frequency, the host CPU 40 ends the processing of the loop A (step C15).

After ending the processing of the loop A, the host CPU 40 sets the observation error matrix R, which has as an observation error the square value of the final expected error acquired in step C11, for each of the code phase and the reception frequency (step C17). Specifically, the observation error matrix R shown in FIG. 2 is set with the square value of the final expected error, which was acquired for the code phase, as the code phase observation error $R_{CP}$ and the square value of the final expected error, which was acquired for the reception frequency, as the reception frequency observation error $R_F$. Then, the host CPU 40 ends the first observation error matrix setting processing.

After returning to the KF position calculation of FIG. 25 to perform the first observation error matrix setting processing, the host CPU 40 calculates the corrected value $X^+$ of the state vector and the corrected value $P^+$ of the error covariance matrix by performing correction process according to the following expressions (9) to (11) (step B13).

$$K(t)=P^-(t)H^T(t)[H(t)P^-(t)H^T(t)+R]^{-1} \quad (9)$$

$$X^+(t)=X^-(t)+K(t)V(t)=X^-(t)+K(t)[Z(t)-H(t)X^-(t)] \quad (10)$$

$$P^+(t)=[I-K(t)H(t)]P^-(t) \quad (11)$$

Here, K is a matrix called a Kalman gain matrix, and R is an observation error matrix set in step B11. A unit matrix is indicated as I.

Then, the host CPU 40 determines the position, which is expressed by the three-dimensional position components (x, y, z) included in the corrected value $X^+$ of the state vector calculated in the correction process, as the output position (step B15). Then, the host CPU 40 generates a position display screen obtained by plotting the output position and displays the position display screen on the display section 60 (step B17).

Then, the host CPU 40 determines whether or not the user has instructed termination of the position calculation using the operating section 50 (step B19). If it is determined that there is no instruction (step B19; No), the process returns to step B1. If it is determined that the termination of the position calculation has been instructed (step B19; Yes), the position calculation ends.

After returning to the main processing of FIG. 24 to perform the processing of one of steps A3 to A7, the host CPU 40 determines whether or not the user has performed a power off instruction operation using the operating section 50 (step A9). Then, if it is determined that the power off instruction operation has not been performed (step A9; No), the process returns to step A1. If it is determined that the power off instruction operation has been performed (step A9; Yes), the main processing ends.

3-3. Operations and Effects

The mobile phone 1 sets as a measurement a reception frequency and a code phase of a GPS satellite signal received from a GPS satellite and calculates the position by performing position calculation based on the theory of a Kalman filter using the measurement as an observed value. In the position calculation, the estimation difference (value of the first measurement parameter) expressed as a difference between the last observed measurement and the last estimated measurement is calculated, and the observation error matrix R used in correction process of a Kalman filter is set using the calculated estimation difference.

More specifically, a model equation for calculating the expected error included in a measurement using the estimation difference is defined beforehand according to the signal strength of a GPS satellite signal. The mobile phone 1 measures the signal strength of a received GPS satellite signal and selects a model equation corresponding to the measured signal strength. Then, the expected error of a measurement is calculated by substituting the estimation difference into the selected model equation.

The relationship between the estimation difference and the actual error included in a measurement is linear, and the correlation is strong. The filter can effectively act in the position calculation by calculating the expected error using a parameter, which shows strong correlation with an actual error included in a measurement, and setting the square value in the observation error matrix R. Accordingly, "position delay", which means that the calculated position is temporally delayed from the actual position, or an event called "shortcut", which means that the followability of the calculated position deteriorates in the curve or the edge. As a result, the accuracy of position calculation can be improved.

When the reliability degree of the expected error calculated using the estimation difference is 2, the calculated expected error is adjusted using the average value of the past expected errors. Specifically, weighted average calculation of the calculated expected error and the past average value of the expected errors is performed. As a result, even if the reliability degree of the calculated expected error is not so high, it becomes possible to set an observation error by changing it to the appropriate value on the basis of the past value.

4. Second Embodiment

A second embodiment is an embodiment in which the observation error matrix R is set while changing the type 1 to type 3 expected errors explained in the principle and the position is calculated by performing the position calculation using the Kalman filter.

4-1. Data Configuration

Figure 28:
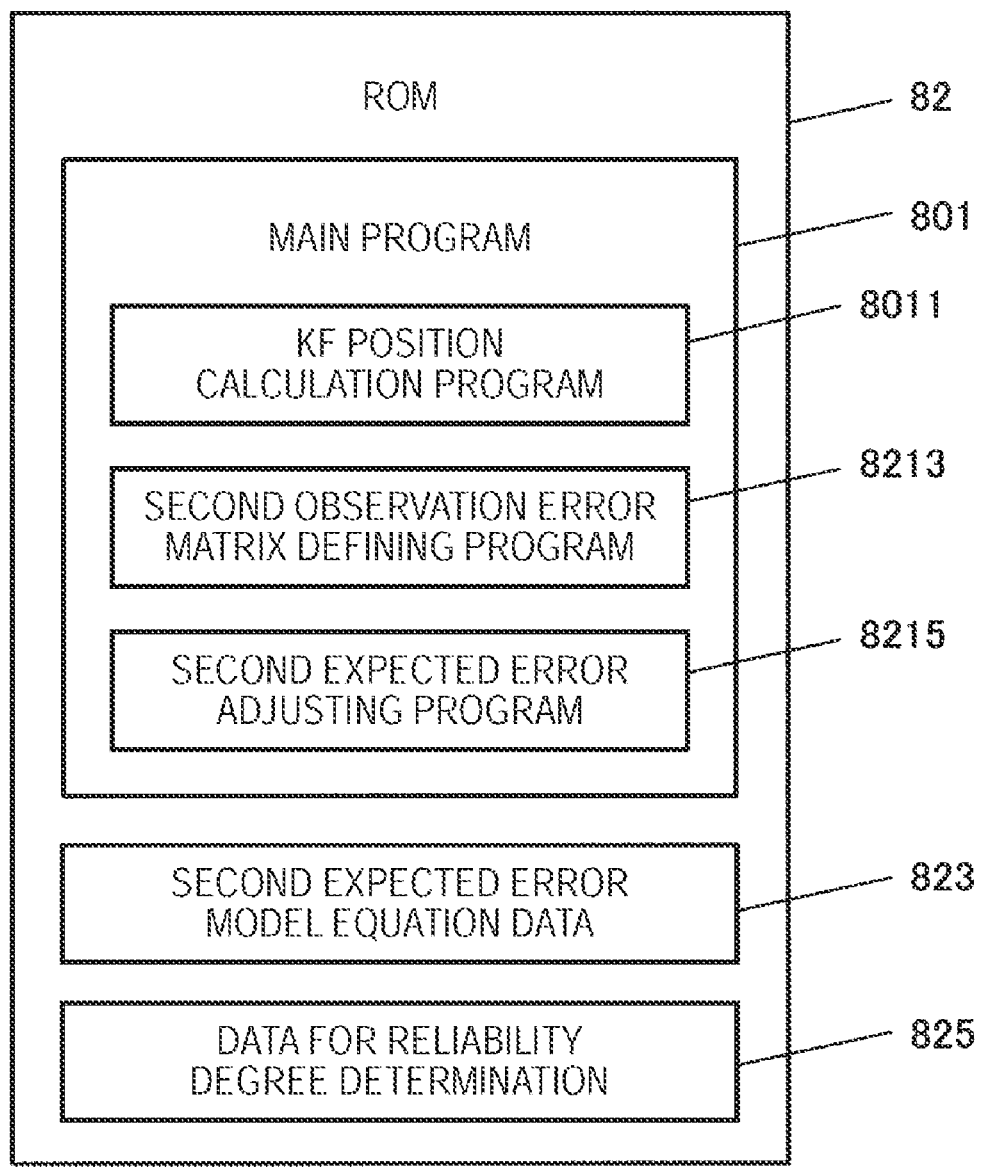
FIG. 28 is a view showing an example of the data stored in a ROM in a second embodiment.

FIG. 28 is a view showing an example of the data stored in a ROM 82 of a mobile phone 1 in the second embodiment. A main program 801, second expected error model equation data 823, and data 825 for reliability degree determination are stored in the ROM 82. A KF position calculation program 8011, a second observation error matrix setting program 8213 executed as second observation error matrix setting processing (refer to FIGS. 30 and 31), and a second expected error adjusting program 8215 executed as second expected error adjusting processing (refer to FIG. 32) are included as a subroutine in the main program 801.

FIG. 29 is a view showing an example of the data configuration of the second expected error model equation data 823. A expected error model equation 8233 is stored in the second expected error model equation data 823 so as to match the signal strength 8231 of a GPS satellite signal. In the expected error model equation 8233, a model equation for calculating the expected errors of the code phase and the reception frequency, which are observed measurements, is stored for each of the type 1 to type 3 measurement parameters.

4-2. Flow of Processing

Figure 30:
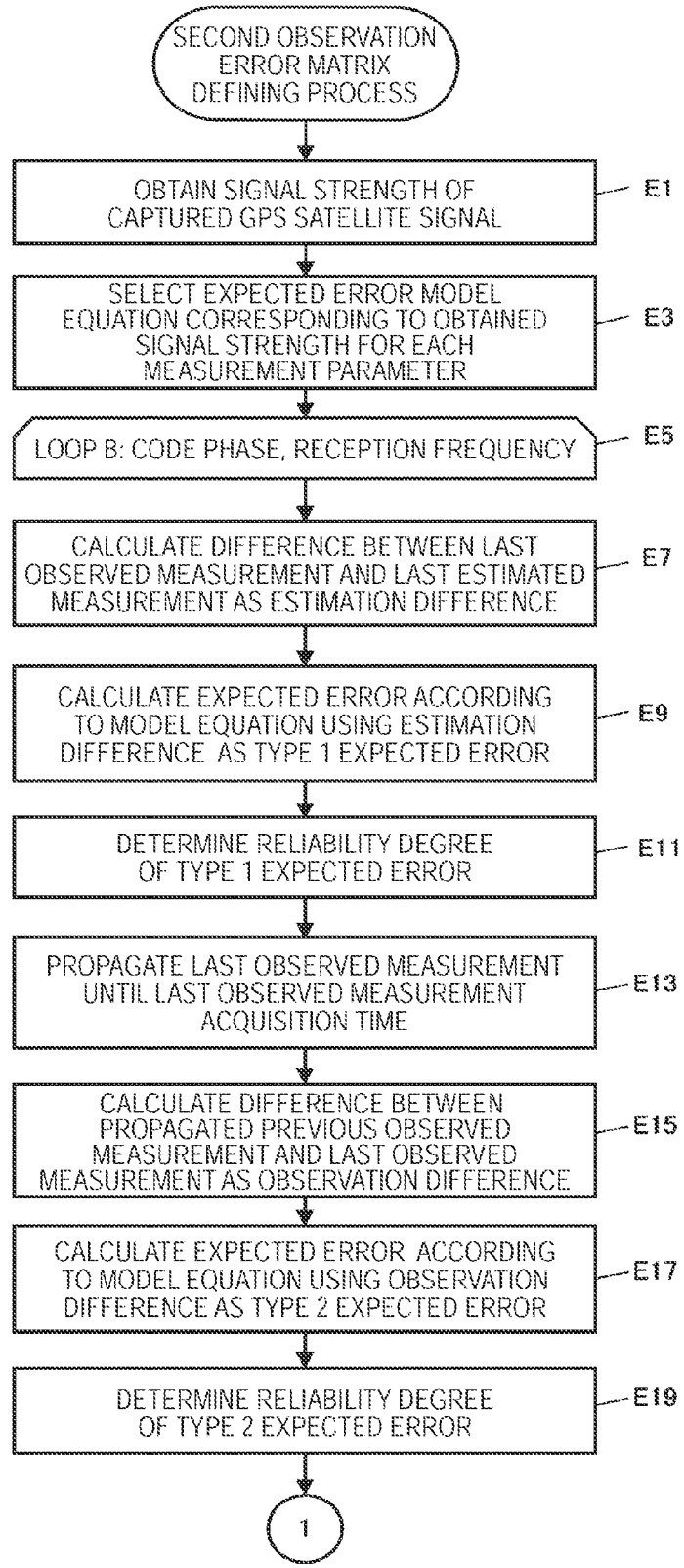
FIG. 30 is a flow chart showing the flow of second observation error matrix setting processing.
Figure 31:
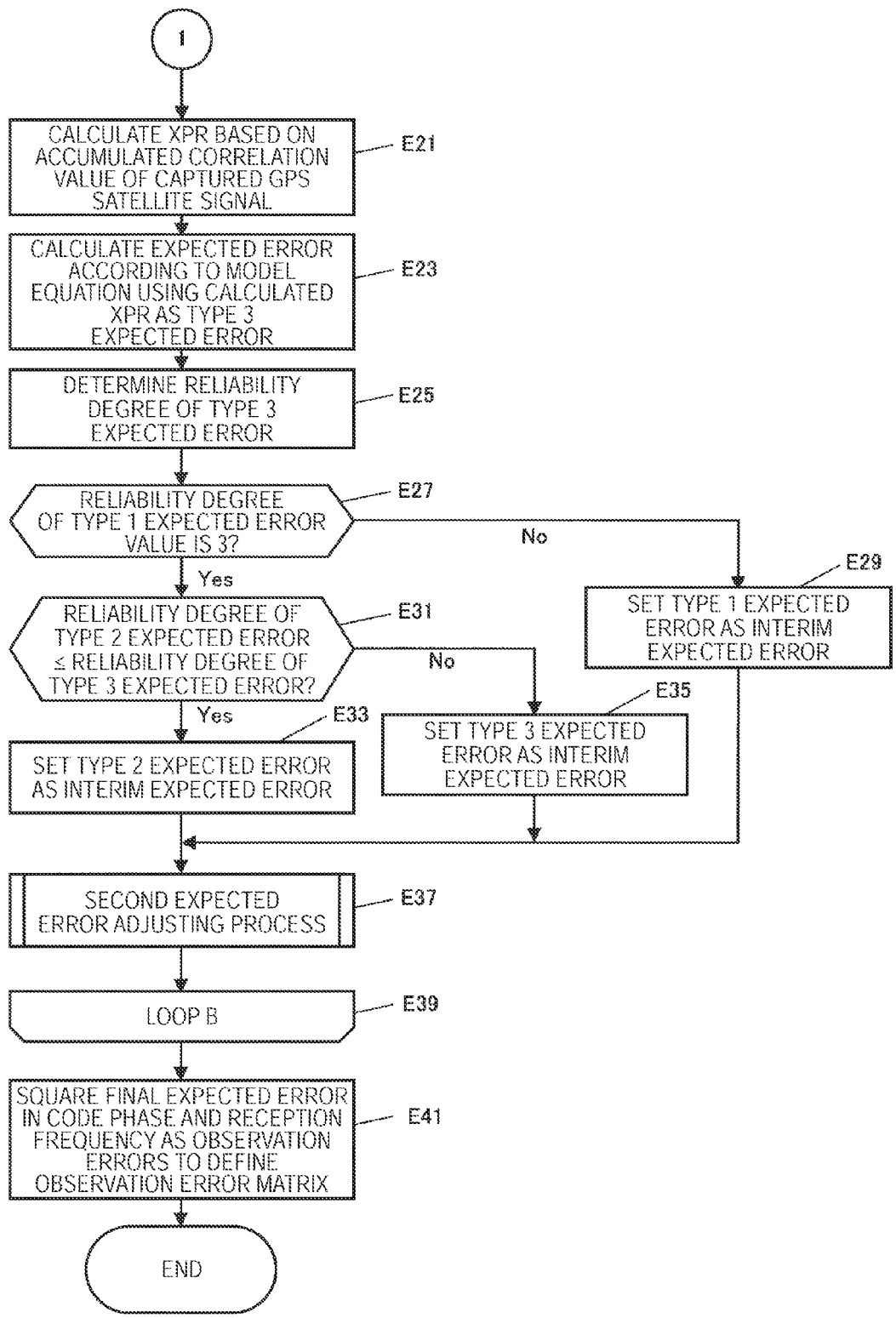
FIG. 31 is a flow chart showing the flow of second observation error matrix setting processing.

FIGS. 30 and 31 are flow charts showing the flow of the second observation error matrix setting processing, which is executed in the mobile phone 1, by reading and executing the second observation error matrix setting program 8213 stored in the ROM 82 by means of the host CPU 40.

First, the host CPU 40 acquires the signal strength of a captured GPS satellite signal from the measurement acquisition operation section 33 (step E1). Then, the host CPU 40 selects the expected error model equation 8233, which corresponds to the acquired signal strength 8231, for each of the three types of measurement parameters referring to the second expected error model equation data 823 stored in the ROM 82 (step E3).

Then, the host CPU 40 executes processing of loop B for each of the code phase and the reception frequency (steps E5 to E39). In the processing of the loop B, the host CPU 40 calculates a difference between the last observed measurement 9013, which is stored in the measurement data 901 of the RAM 90, and the last estimated measurement 9015 and sets the difference as a estimation difference (step E7). Then, using the calculated estimation difference, the host CPU 40 calculates the expected error according to the expected error model equation selected in step E3 and sets it as the type 1 expected error (step E9).

Then, the host CPU 40 determines the reliability degree of the type 1 expected error calculated in step E9 (step E11). Specifically, the host CPU 40 determines to which of "1" to "3" the reliability degree of the type 1 expected error corresponds by performing threshold determination on the estimation difference according to a determination method of the reliability degree corresponding to the type 1 measurement parameter referring to the data 823 for reliability degree determination stored in the ROM 82.

Then, the host CPU 40 performs propagate processing to propagate the previous observed measurement 9013 stored in the measurement data 901 until the acquisition time of the last observed measurement 9013 (step E13).

Then, the host CPU 40 calculates a difference between the propagate value of the previous observed measurement 9013 acquired in the propagate processing and the last observed measurement and sets the difference as a last observation difference (step E15). Then, using the calculated last observation difference, the host CPU 40 calculates the expected error according to the expected error model equation selected in step E3 and sets it as the type 2 expected error (step E17).

Then, the host CPU 40 determines the reliability degree of the type 2 expected error calculated in step E17 (step E19). Specifically, the host CPU 40 determines to which of "1" to "3" the reliability degree of the type 2 expected error corresponds by performing threshold determination on the last observation difference according to a determination method of the reliability degree corresponding to the type 2 measurement parameter referring to the data 823 for reliability degree determination stored in the ROM 82.

Then, the host CPU 40 calculates the XPR on the basis of the correlation integral value of a GPS satellite signal received from the captured satellite (step E21). Then, using the calculated XPR, the host CPU 40 calculates the expected error according to the expected error model equation selected in step E3 and sets it as the type 3 expected error (step E23).

Then, the host CPU 40 determines the reliability degree of the type 3 expected error calculated in step E23 (step E25). Specifically, the host CPU 40 determines to which of "1" and "2" the reliability degree of the type 3 expected error corresponds by performing threshold determination on the XPR according to a determination method of the reliability degree corresponding to the type 3 measurement parameter referring to the data 825 for reliability degree determination stored in the ROM 82.

Then, the host CPU 40 determines whether or not the reliability degree of the type 1 expected error is 3 (step E27). If it is determined that the reliability degree of the type 1 expected error is not 3, that is, if it is determined that the reliability degree of the type 1 expected error is 1 or 2 (step E27; No), the host CPU 40 sets the type 1 expected error as a interim expected error (step E29).

On the other hand, if it is determined that the reliability degree of the type 1 expected error is 3 in step E27 (step E27: Yes), the host CPU 40 determines whether or not the reliability degree of the type 2 expected error is equal to or lower than the reliability degree of the type 3 expected error (step E31). That is, the host CPU 40 determines whether or not the reliability degree of the type 2 expected error is equal to or higher than the reliability degree of the type 3 expected error.

Then, if the above condition is satisfied (step E31; Yes), the host CPU 40 sets the type 2 expected error as a interim expected error (step E33). On the other hand, if the above condition is not satisfied (step E31; No), the host CPU 40 sets the type 3 expected error as a interim expected error (step E35).

After performing one processing of steps E29, E33 and E35, the host CPU 40 performs second expected error adjusting processing by reading and executing the second expected error adjusting program 8215 stored in the ROM 82 (step E37).

Figure 32:
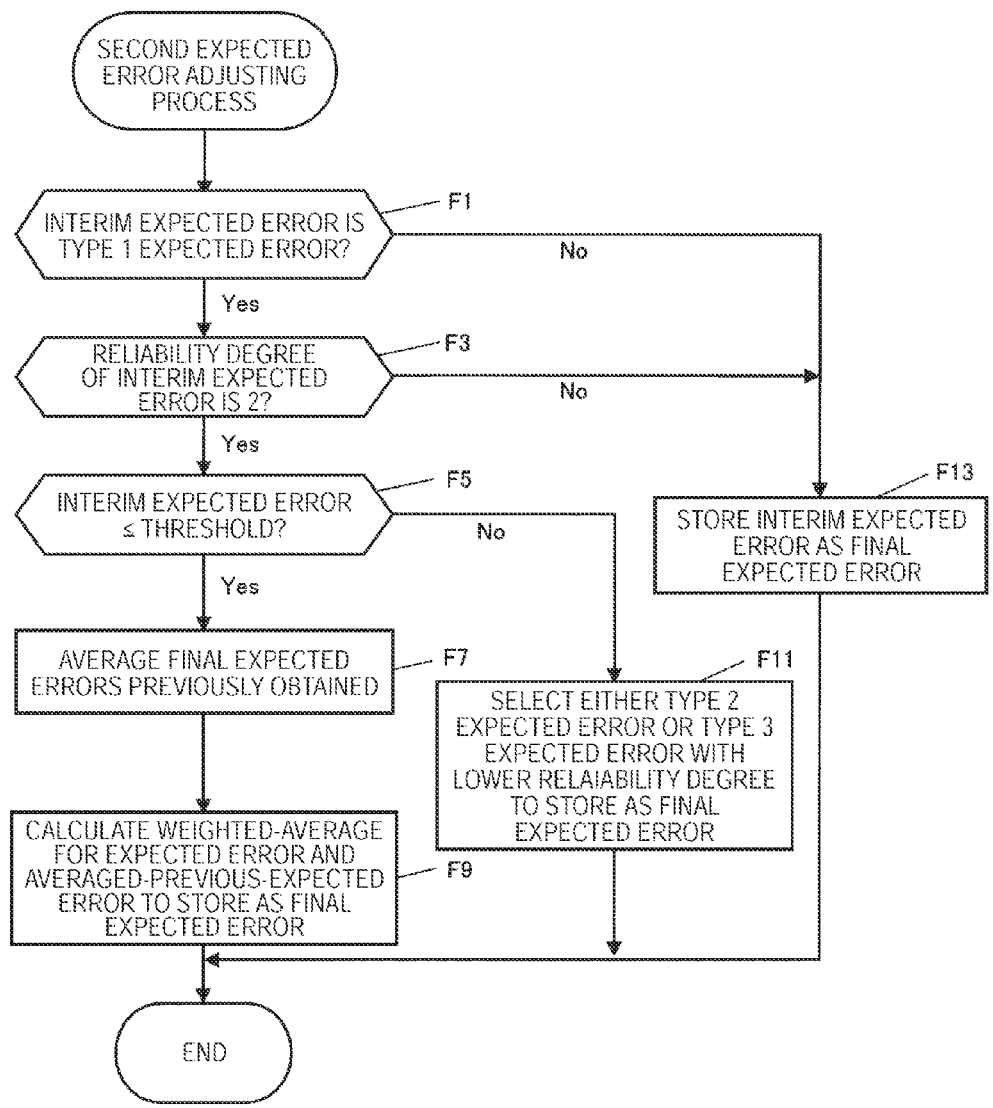
FIG. 32 is a flow chart showing the flow of second expected error adjusting processing.

FIG. 32 is a flow chart showing the flow of the second expected error adjusting processing.

First, the host CPU 40 determines whether or not the interim expected error is a type 1 expected error (step F1). If it is determined that the interim expected error is the type 1 expected error (step F1; Yes), the host CPU 40 determines whether or not the reliability degree of the type 1 expected error which is the interim expected error is 2 (step F3).

Then, if it is determined that the reliability degree of the type 1 expected error is 2 (step F3; Yes), the host CPU 40 determines whether or not the magnitude of the interim expected error is equal to or smaller than a predetermined threshold (step F5). Then, if it is determined that the magnitude of the interim expected error is equal to or smaller than the predetermined threshold (step F5; Yes), the host CPU 40 calculates the average value of the final expected errors calculated in the past referring to the final expected error history data 907 in the RAM 90 and sets the calculated average value as a past average value (step F7).

Then, the host CPU 40 performs weighted average calculation of the interim expected error and the past average value and stores the calculated value as a final expected error in the final expected error history data 907 (step F9). Specifically, the weighted average calculation is performed in a state where the weight of the interim expected error is set to $\alpha$ and the weight of the past average value is set to $1-\alpha$.

On the other hand, if it is determined that the interim expected error is larger than the threshold in step F5 (step F5; No), the host CPU 40 selects the expected error of one of the type 2 expected error and the type 3 expected error which has higher reliability degree, sets the selected expected error as a final expected error, and stores it in the final expected error history data 907 (step F11).

If it is determined that the interim expected error is not the type 1 expected error but the type 2 or type 3 expected error in step F1 (step F1; No), the host CPU 40 stores the interim expected error as a final expected error in the final expected error history data 907 (step F13). In this case, the type 2 or type 3 expected error is set to the final expected error.

Also when it is determined that the reliability degree of the type 1 expected error which is the interim expected error is not 2 but 1 in step F3 (step F3; No), the host CPU 40 stores the interim expected error as a final expected error in the final expected error history data 907 (step F13). In this case, the type 1 expected error is set to the final expected error.

From steps E27 and E29 in FIG. 31, the type 1 expected error is set to the interim expected error when the reliability degree of the type 1 expected error is 1 or 2. Therefore, step F1; Yes in FIG. 32 is when the reliability degree of the type 1 expected error is 1 or 2, and step F3; No is limited to the case where the reliability degree of the type 1 expected error is 1.

After performing one processing of steps F9 to F13, the host CPU 40 ends the second expected error adjusting processing.

After returning to the second observation error matrix setting processing of FIG. 31 to perform the second expected error adjusting processing, the host CPU 40 moves the processing to the next type of measurement. Then, after performing the processing of steps E7 to E37 for each of the code phase and the reception frequency, the host CPU 40 ends the processing of the loop B (step E39).

After ending the processing of the loop B, the host CPU 40 sets the observation error matrix R, which has as an observation error the square value of the final expected error acquired in step E37, for each of the code phase and the reception frequency (step E41). Then, the host CPU 40 ends the second observation error matrix setting processing.

4-3. Operations and Effects

In the second embodiment, for each of the type 1 to type 3 measurement parameters, the expected error set as an observation error is changed on the basis of the reliability degree of the type 1 to type 3 expected errors calculated according to the expected error model equation. Specifically, when the reliability degree of the type 1 expected error is 1 or 2, the observation error is set using the type 1 expected error. However, when the reliability degree of the type 1 expected error is 3, the observation error is set using the type 2 expected error if the reliability degree of the type 2 expected error is equal to or lower than the reliability degree of the type 3 expected error.

There is strong positive correlation between the estimation difference, which is the type 1 measurement parameter, and an actual error of a measurement. Accordingly, among the type 1 to type 3 measurement parameters, the type 1 measurement parameter is a parameter which is most suitable for setting of the observation error. For this reason, except for the case where the reliability degree of the type 1 measurement parameter was 3, the observation error was set using the type 1 expected error.

It could be seen that there was a certain amount of positive correlation between the last observation difference, which was the type 2 measurement parameter, and the actual error of a measurement even though the correlation was not so strong as in the case of the type 1 measurement parameter. For this reason, when the reliability degree of the type 1 measurement parameter was low, the observation error was set using the type 2 measurement parameter expected error.

Thus, by changing the expected error used for the setting of an observation error according to the reliability degree of the expected error, it becomes possible to set a suitable observation error and perform position calculation. As a result, the accuracy of the position calculation is further improved.

5. Experimental Results

Figure 33:
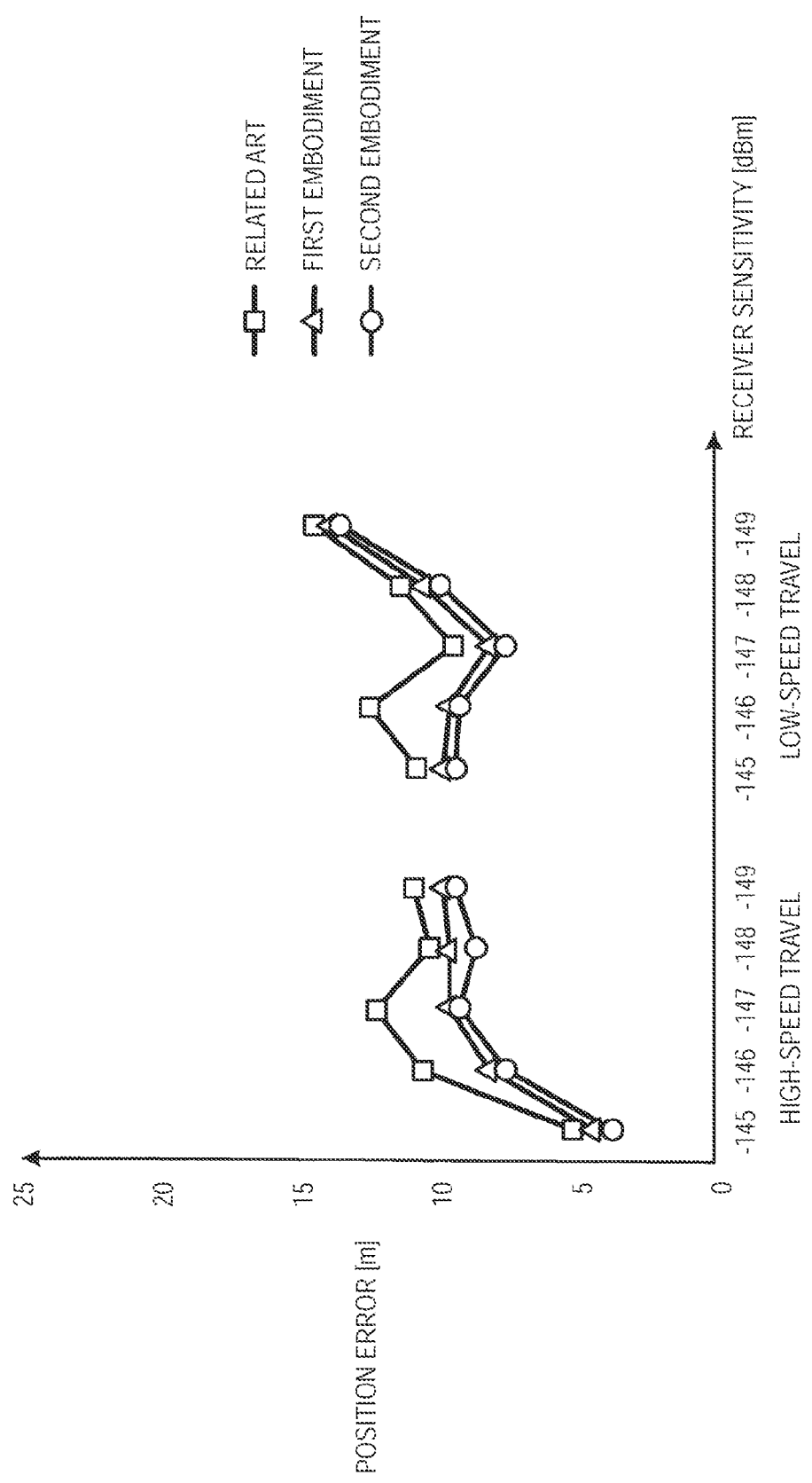
FIG. 33 is a view showing an example of an experimental result after performing the position calculation.

FIG. 33 is an experimental result showing the magnitude of a position error when the position of the mobile phone 1 was calculated by performing the position calculation using each of the method described in the first embodiment, the method described in the second embodiment, and the known method. An automobile having the mobile phone 1 mounted therein was made to travel at low speed and high speed, and the distance between the calculated position acquired in the position calculation and the actual position of the automobile was measured as a position error.

In FIG. 33, the horizontal axis indicates the receiver sensitivity [dBm] of a GPS receiver, and the vertical axis indicates a position error [m]. A circle shows an experimental result when the position calculation was performed using the method described in the second embodiment, a triangle shows an experimental result when the position calculation was performed using the method described in the first embodiment, and a rectangle shows an experimental result when the position calculation was performed using the known method.

From this result, it can be seen that the position error when the position calculation was performed using the known method is the largest over the entire receiver sensitivity. On the other hand, it can be seen that the position error when the position calculation was performed using the method described in the second embodiment is the smallest and the position error when the position calculation was performed using the method described in the first embodiment is also small.

6. Modifications 6-1. Electronic Apparatus

The invention may be applied not only to the mobile phone but also to any kind of electronic apparatus as long as the electronic apparatus includes a position calculating device. For example, the invention may also be similarly applied to a notebook computer, a PDA (Personal Digital Assistant), a car navigation apparatus, and a portable navigation apparatus.

6-2. Satellite Position Calculating System

In the above embodiment, an explanation has been made using a GPS as an example of a satellite position calculating system. However, other satellite position calculating systems may also be used, such as WAAS (wide area augmentation system), QZSS (quasi zenith satellite system), GLONASS (global navigation satellite system), and GALILEO.

6-3. Division of Processing

Some or all of processing that the host CPU 40 executes may be performed by the operation control section 31 of the baseband processing circuit section 30. For example, the operation control section 31 may determine the output position by performing the KF position calculation using the observed measurement calculated by the measurement acquisition operation section 33 and output the output position to the host CPU 40. The host CPU 40 uses the output position input from the operation control section 31 for various applications.

6-4. Change of a Expected Error

In the second embodiment described above, the interim expected error was used for the setting of an observation error by changing the type 1 to type 3 expected errors on the basis of the reliability degree of the expected error. However, two types of the first and type 2 expected errors may be changed and used for the setting of an observation error without using the type 3 expected error.

Specifically, for example, when the reliability degree of the type 1 expected error is 3, it is expected that the type 1 expected error is not reliable and the type 2 expected error is set as a interim expected error. On the other hand, when the reliability degree of the type 1 expected error is 1 or 2, it is assumed that the type 1 expected error is reliable and the type 1 expected error is set as a interim expected error.

When both the reliability degree of the type 1 expected error and the reliability degree of the type 2 expected error are 1 or 2, both the values are reliable and the average value of the type 1 expected error and the type 2 expected error may be set as a interim expected error.

6-5. Adjustment of a Expected Error

In the embodiment described above, the expected error was adjusted by performing weighted average calculation of the expected error and the past average value of the expected errors in adjustment processing of the expected error. In this case, although the weight α in the weighted average calculation was set as a fixed value, the weight α may also be set to be variable.

For example, when many past expected errors with high reliability degree (for example, reliability degree 1) are included, it is considered to set the weight α as a small value (for example, α=0.2) so that the past average value is regarded as important. On the contrary, when many past expected errors with low reliability degree (for example, reliability degree 3) are included, the weight α may be set as a large value (for example, α=0.8) so that the expected errors are regarded as important.

It is possible to estimate the expected error at the position calculation time on the basis of history of the past expected error and to adjust the expected error using the estimated value (hereinafter, referred to as an "expected error estimation value"). For example, the expected error may be changed to the expected error estimation value, or the average value of the expected error and the expected error estimation value may be calculated and changed to the corresponding average value.

6-6. Corresponding Relationship

In the embodiment described above, a model equation for calculating the expected error was defined according to the signal strength of a GPS satellite signal. However, a table may be defined instead of the model equation. That is, a table in which the value of a measurement parameter and the expected error are matched with each other is prepared according to the signal strength of a GPS satellite signal, and the observation error is set by reading the expected error from the table.

6-7. Expected Error Model Equation

In the embodiment described above, a model equation obtained by combining two linear functions was defined as a model equation for calculating the expected error using the XPR which is the type 3 measurement parameter. However, for example, the model equation may be defined by a hyperbola, and the kind of the model equation may be appropriately changed.

What is claimed is:

1. A position calculating method comprising:
   estimating, by a position calculating device, a reception frequency and a code phase as an estimated measurement in relation to receiving a positioning signal from a positioning satellite, wherein the position calculating device comprises a processor and a non-transitory computer readable medium comprising code executable by the processor;
   obtaining, by the position calculating device, a reception frequency and a code phase as an observed measurement based on the positioning signal received;
   selecting, by the position calculating device, an error model to be used based on a signal strength of the obtained reception frequency;
   configuring, by the position calculating device, an error parameter value to be used in a position calculation based on a difference between the observed measurement and the estimated measurement and the error model; and
   calculating, by the position calculating device, a position using the error parameter value.

2. The position calculating method according to claim 1, further comprising:
   estimating a state vector used in the position calculation; and
   correcting the estimated state vector,
   wherein the estimating the estimated measurement includes estimating a first measurement based on the estimated state vector, and
   the calculating of the position includes calculating the position based on the corrected state vector.

3. The position calculating method according to claim 2, wherein the estimating the estimated measurement includes estimating a second measurement used in the position calculation based on the observed measurement at the time of receiving the positioning signal and the time elapsed since.

4. The position calculating method according to claim 3, further comprising:
   determining reliability of the first estimated measurement and reliability of the second estimated measurement,
   wherein the configuring the error parameter value includes using the first estimated measurement or the second estimated measurement depending on the determined reliability.

5. The position calculating method according to claim 4, further comprising:
   adjusting the error parameter value based on any of previous parameter errors when the reliabilities determined satisfy a predetermined reliability condition,
   wherein the calculating the position includes calculating the position calculation using the adjusted error parameter value.

6. The position calculating method according to claim 1, wherein
   a corresponding relationship of the signal strength of the positioning signal, a difference between the observed measurement and the estimated measurement, and an expected error of the observed measurement is predetermined,
   the method further including measuring a signal strength of the received positioning signal, wherein
   the configuring the error parameter value includes calculating expected error using the signal strength and the difference between the observed measurement and the estimated measurement, and
   configuring the error parameter value based on the expected error.

7. The position calculating method according to claim 1, wherein
   a corresponding relationship of the signal strength of the positioning signal, the signal quality evaluation index, and an expected error of the observed measurement is predetermined,
   the method further including measuring a signal strength of the received positioning signal; and
   calculating a signal quality evaluation index of the received positioning signal, wherein
   the configuring the error parameter value includes calculating the expected error using the measured signal strength and the calculated signal quality evaluation index, and
   configuring the error parameter value based on the expected error.

8. A position calculating device comprising:
an estimating section that estimates a reception frequency and a code phase as an estimated measurement in relation to receiving a positioning signal from a positioning satellite;
an observation section that acquires a reception frequency and a code phase as an observed measurement based on the positioning signal received;
a selecting section that selects an error model based on a signal strength of the reception frequency acquired;
a configuring section that configures an error parameter value used in a position calculation based on a difference between the observed measurement and the estimated measurement and the error model; and
a position calculating section that calculates a position using the error parameter value.

* * * * *